(12) United States Patent
Gupta et al.

(10) Patent No.: US 6,684,388 B1
(45) Date of Patent: Jan. 27, 2004

(54) METHOD FOR GENERATING PLATFORM INDEPENDENT, LANGUAGE SPECIFIC COMPUTER CODE

(75) Inventors: Arun K. Gupta, Easton, CT (US); Rajiv K. Uppal, Trumbull, CT (US); Devang I. Parikh, Bethel, CT (US)

(73) Assignee: International Business Machines Corporation, Armonk, NY (US)

( * ) Notice: Subject to any disclaimer, the term of this patent is extended or adjusted under 35 U.S.C. 154(b) by 492 days.

(21) Appl. No.: 09/643,527

(22) Filed: Aug. 22, 2000

(51) Int. Cl.$^7$ ................................................. G06F 9/45
(52) U.S. Cl. ..................... 717/136; 717/106; 717/137; 717/117; 706/46; 706/47; 706/60; 706/61; 704/2
(58) Field of Search .................... 717/106, 110–113, 717/136–140, 142, 143, 100, 101, 117; 704/2, 9; 707/4; 706/47, 46, 13, 61, 60

(56) References Cited

U.S. PATENT DOCUMENTS

| | | | |
|---|---|---|---|
| 4,367,525 A | 1/1983 | Brown et al. ................... 710/18 |
| 4,542,458 A | 9/1985 | Kitajima et al. ............. 709/104 |
| 4,665,478 A | 5/1987 | Hirose et al. ................... 710/18 |
| 4,667,290 A * | 5/1987 | Goss et al. ................... 717/147 |
| 4,713,775 A * | 12/1987 | Scott et al. ..................... 706/45 |
| 4,935,876 A * | 6/1990 | Hanatsuka .................... 706/50 |
| 5,257,371 A | 10/1993 | Anezaki ................. 707/103 R |
| 5,265,250 A | 11/1993 | Andrade et al. ............. 709/101 |
| 5,305,389 A | 4/1994 | Palmer ........................ 382/305 |
| 5,327,559 A | 7/1994 | Priven et al. ................ 709/101 |
| 5,442,792 A * | 8/1995 | Chun ........................... 717/155 |
| 5,485,610 A | 1/1996 | Gioielli et al. ............... 707/102 |
| 5,584,035 A | 12/1996 | Duggan et al. .............. 345/765 |
| 5,644,770 A | 7/1997 | Burke et al. ................. 717/166 |
| 5,655,150 A | 8/1997 | Matsumoto et al. .......... 710/17 |
| 5,675,739 A | 10/1997 | Eilert et al. ................. 709/226 |
| 5,680,617 A | 10/1997 | Gough et al. ............. 707/106.1 |
| 5,692,215 A | 11/1997 | Kutzik et al. ................. 710/18 |
| 5,694,601 A | 12/1997 | White ......................... 709/101 |
| 5,706,505 A | 1/1998 | Fraley et al. ........... 707/103 R |
| 5,710,920 A | 1/1998 | Maruyama et al. ..... 707/103 R |
| 5,721,900 A | 2/1998 | Banning et al. ............... 707/4 |
| 5,721,901 A | 2/1998 | Banning et al. ............... 707/4 |
| 5,721,912 A | 2/1998 | Stepczyk et al. ........... 707/102 |
| 5,724,556 A | 3/1998 | Souder et al. ................. 703/2 |
| 5,732,257 A | 3/1998 | Atkinson et al. ............... 707/4 |
| 5,751,909 A | 5/1998 | Gower ......................... 706/45 |
| 5,758,349 A | 5/1998 | Breslau et al. ............. 709/316 |
| 5,764,958 A | 6/1998 | Coskun ...................... 709/315 |
| 5,778,359 A * | 7/1998 | Stent ............................. 707/4 |
| 5,794,049 A * | 8/1998 | Lindholm .................. 717/136 |
| 5,809,266 A | 9/1998 | Touma et al. ............... 345/764 |
| 5,835,758 A | 11/1998 | Nochur et al. ............. 707/102 |
| 5,842,213 A | 11/1998 | Odom et al. ................ 707/100 |
| 5,848,145 A | 12/1998 | Gallagher et al. ...... 379/221.06 |
| 5,850,548 A | 12/1998 | Williams .................... 717/143 |
| 5,850,631 A | 12/1998 | Golshani et al. ........... 707/102 |
| 5,864,862 A | 1/1999 | Kriens et al. ............... 707/103 |
| 5,872,969 A | 2/1999 | Copeland et al. ........... 709/101 |
| 5,872,971 A | 2/1999 | Knapman et al. .......... 709/101 |
| 5,875,334 A * | 2/1999 | Chow et al. ................ 717/141 |
| 5,884,081 A | 3/1999 | Burbeck .................... 717/128 |

(List continued on next page.)

OTHER PUBLICATIONS

Title: Transoportability to Other Languages: The Natural Language Processing Project in the Al Program at MCC, author: Slocum et al, ACM, 1985.*

(List continued on next page.)

*Primary Examiner*—Chameli C. Das
(74) *Attorney, Agent, or Firm*—Ritter, Lang & Kaplan LLP

(57) ABSTRACT

A method of generating language specific code comprising the steps of extracting neutral code from a knowledge base, preprocessing the neutral code, providing a code generator with the preprocessed neutral code and a target language in to which the preprocessed neutral code is to be translated, and processing the preprocessed neutral code by translating the neutral code into a target language code.

17 Claims, 17 Drawing Sheets

Flow Chart of Generation

U.S. PATENT DOCUMENTS

| | | | | |
|---|---|---|---|---|
| 5,892,917 | A | | 4/1999 | Myerson ..................... 709/204 |
| 5,893,105 | A | | 4/1999 | MacLennan ................. 707/102 |
| 5,901,319 | A | | 5/1999 | Hirst .......................... 717/164 |
| 5,903,897 | A | | 5/1999 | Carrier, III et al. .......... 707/203 |
| 5,907,847 | A | | 5/1999 | Goldberg ................ 707/103 R |
| 5,911,075 | A | | 6/1999 | Glaser et al. ................ 717/100 |
| 5,913,061 | A | | 6/1999 | Gupta et al. ................ 709/310 |
| 5,915,253 | A | | 6/1999 | Christiansen ............... 707/103 |
| 5,924,109 | A | | 7/1999 | Ackerman et al. ........... 715/531 |
| 5,946,682 | A | | 8/1999 | Wolfe ............................. 707/5 |
| 5,946,694 | A | | 8/1999 | Copeland et al. ........ 707/103 R |
| 5,956,506 | A | | 9/1999 | Cobb et al. .................. 709/101 |
| 5,964,828 | A | | 10/1999 | Cummins .................... 709/101 |
| 5,966,535 | A | | 10/1999 | Benedikt et al. ............ 717/147 |
| 5,970,498 | A | | 10/1999 | Duffield et al. .......... 707/104.1 |
| 5,974,443 | A | | 10/1999 | Jeske .......................... 709/202 |
| 5,991,528 | A | * | 11/1999 | Taylor et al. ................... 703/6 |
| 5,991,535 | A | | 11/1999 | Fowlow et al. ............. 717/107 |
| 6,003,037 | A | | 12/1999 | Kassabgi et al. ........... 707/103 |
| 6,014,637 | A | | 1/2000 | Fell et al. ...................... 705/26 |
| 6,066,181 | A | * | 5/2000 | DeMaster ................... 717/140 |
| 6,233,731 | B1 | * | 5/2001 | Bond et al. ................. 717/138 |
| 6,237,136 | B1 | * | 5/2001 | Sadahiro ..................... 717/110 |
| 6,257,774 | B1 | * | 7/2001 | Stack .......................... 717/110 |
| 6,269,475 | B1 | * | 7/2001 | Farrell et al. ................ 717/113 |
| 6,357,002 | B1 | * | 3/2002 | Lupo et al. ..................... 713/1 |
| 6,463,404 | B1 | * | 10/2002 | Appleby ......................... 704/9 |
| 6,513,027 | B1 | * | 1/2003 | Powers et al. ................ 706/47 |
| 6,529,865 | B1 | * | 3/2003 | Duan et al. ..................... 704/9 |

OTHER PUBLICATIONS

Title: Knowledge and Natural Language Processing, author: Barnett et al, ACM, 1990.*

Title: Object–Oriented Real–Time Systems Using a Hybrid Distributed Model of Ada 95's Built in DSA Capability (Distributed Systems Annex–E) and CORBA, author: Moody et al, Ada Letters, 1997.*

Title: Pellpack: A problem–solving environment for PDE–Based Applications on multicomputer platforms, author: Houstis et al, ACM, 1998.*

Title: PHRAN_SPAN: A Natural Language Interface for System Specifications, author: Granacki et al, ACM/IEEE, 1987.*

Title: Interactive Feature Extraction for a Form Feature Conversion System, author: Suh et al, ACM, 1997.*

* cited by examiner

METHOD FOR GENERATING PLATFORM INDEPENDENT, LANGUAGE SPECIFIC COMPUTER CODE

BACKGROUND OF THE INVENTION (1) Field of the Invention

This invention relates to a method for generating language specific computer code, and more particularly to an object oriented based methodology for defining business functionality in a neutral format from which language specific code can be generated.

(2) Description of the Related Art

The proliferation of architected computer systems to facilitate and automate electronic transactions has given rise to a plurality of hardware and software platforms upon which such transactions are enabled. In a typical client/server transaction it is quite possible that the client component is coded in a software language and executed on a hardware platform which are both different from the hardware platform upon which the server component is executing as well as the computer language in which the server executable component is written. As a result, it often times necessary to overcome technical hurdles when attemting to perform even the simplest of transactions between architected computer system components which are not technology congruent.

With the advent of internet communication and attendant internet browsers such as Internet Explorer™ by Microsoft Corporation of Redmond, Calif., there has been established an infrastructure for the creation and execution of electronic and computer transactions which is largely hardware and software independent. Most internet browsers are created to run in a similar manner on a variety of hardware platforms and exchange information coded in a language such as JAVASCRIPT or Hypertext Markup Language (HTML). JAVASCRIPT and HTML allow for the detailed definition of web pages with embedded logical code capable of interacting with other system components in connectivity with the internet without the need to ascertain the specific nature of such other systems.

However, while a level of uniformity has been attained through the widespread use of internet applications, there exists still a plurality of internet browser languages. It is therefore still necessary to translate code into a plurality of different browser languages in order to allow maximum access to an internet enabled executable. In addition to merely translating existing code into a plurality of different languages, it is also desirable to alter the functionality of code during the translation process to make maximal use of the variations amongst different languages which provide differing functionality.

However, such alterations are quite difficult owing to the fact that the repositories in which logic is stored for an application, and from which code may be generated, often times represent dicreet units of business functionality in a manner which does not lend itself to the complex task of understanding the relationships existing between each one of such units and using such relationships to maximize the efficiencies of generated code.

What is needed therefore is a method for storing the business objects which form a model for business functionality from which may be generated code. Such code, when executed on an internet enabled platform, will enable the modeled business functionality to be performed regardless of the hardware of software platforms upon which the code is executed. In addition, such code should be capable of being generated into a plurality of computer languages and should not require alterations to the methodology by which the underlying business objects are modeled.

BRIEF SUMMARY OF THE INVENTION

Accordingly, one aspect of the present invention is drawn to a method of generating language specific code comprising the steps of extracting neutral code from a knowledge base, preprocessing the neutral code, providing a code generator with the preprocessed neutral code and a target language in to which the preprocessed neutral code is to be translated, and processing the preprocessed neutral code by translating the neutral code into a target language code.

Yet another aspect of the present invention is drawn to the aforementioned method wherein the code generator comprises a generator comprising the logical rules which form the target language, and a tech blade component comprising the syntax of the target language.

Yet another aspect of the present invention is drawn to the aforementioned method wherein processing the preprocessed code comprises the step of invoking a code generator to translate the neutral code into target language code.

Yet another aspect of the present invention is drawn to the aforementioned method wherein translating the neutral code into target language code comprises the steps of requesting syntactic information from a tech blade, and combining the structure of the neutral code with the syntactic information.

Still another aspect of the present invention is drawn to the aforementioned method wherein the preprocessing of the neutral code comprises the step of removing space characters from variable names.

Yet another aspect of the present invention is drawn to the aforementioned method wherein the preprocessing of the neutral code comprises the step of resolving variable scope conflicts.

Yet another aspect of the present invention is drawn to the aforementioned method wherein the preprocessing of the neutral code comprises the step of interactively alerting a user of possible undefined or misdefined variables.

Yet another aspect of the present invention is drawn to the aforementioned method wherein the code generator is stored as a dynamic link library (DLL).

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
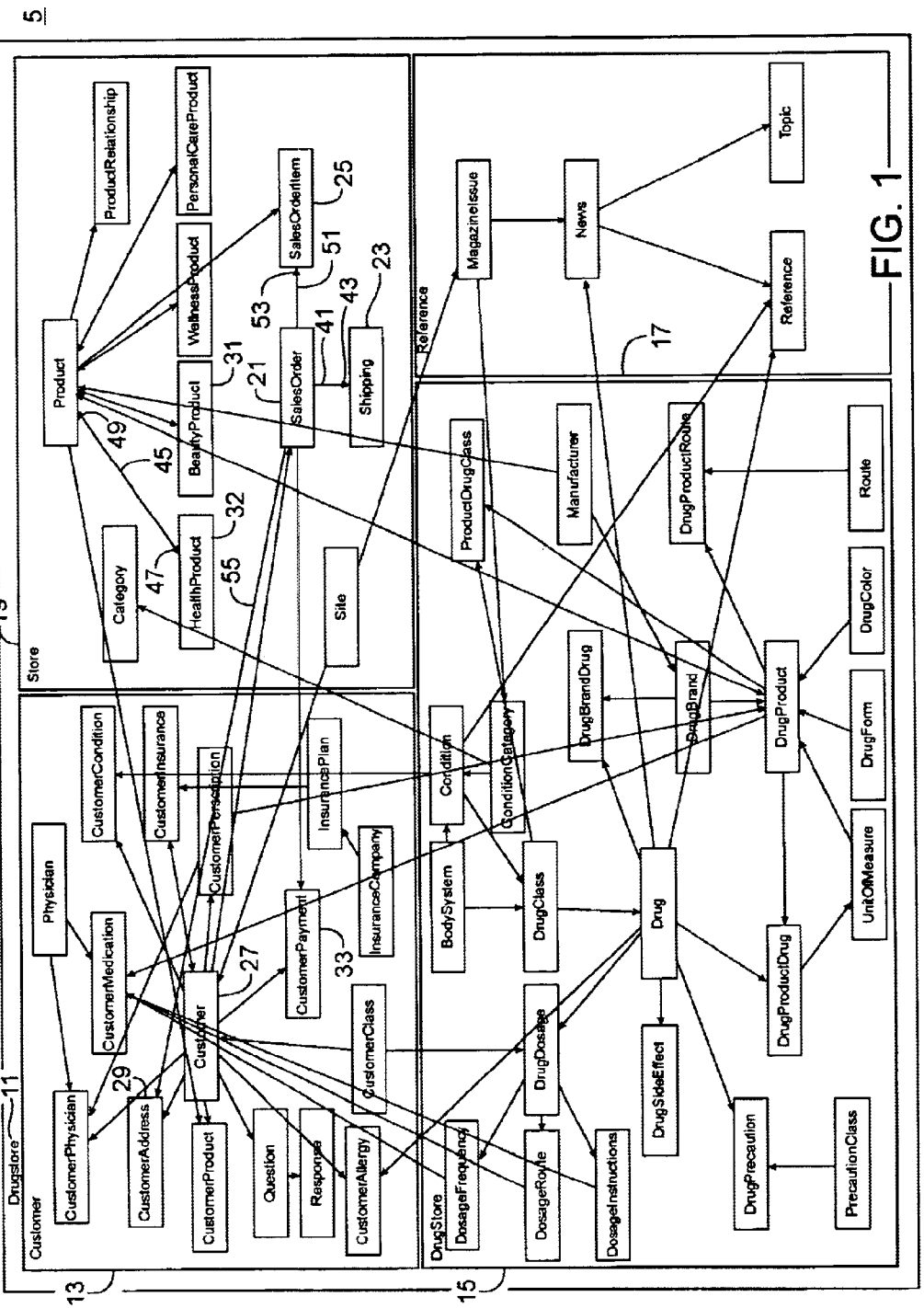
FIG. 1 is a screen rendering of an Object Modeler GUI in accordance with the invention.

When executing software on a computer, a Business Object is a data object, for which storage space on an electronic medium has been allocated, derived from a Business Class template. By template, it is meant that a Business Class defines the generic definition of a Business Object. A data object is an entity stored in an electronic format that is comprised of information. A Business Object is, therefore, a dynamically allocated instance of the static Business Class. A Business Class is comprised of attributes, methods, external messages and web documents. Detailed examples of attributes, methods, external messages and web documents are provided below. The Business Processes, comprising in part the Business Class, are themselves comprised of Business Rules, methods, and subprocesses. Business Rules and Business Processes are defined more specifically below. An advantage of the present invention is the ability to model all business activities as interactions between Business Classes.

The structure and organization of the Business Class is such as to uniquely and completely define the attributes of the Business Class. Because the Business Class, when implemented in computer code will often take the form of an OOP class definition, the structure of Business Classes as herein defined bears superficial resemblance to OOP classes. OOP class definitions form the core of various OOP languages including, but not limited to, C++. However, in accordance with the present invention, Business Classes are not limited to implementations in OOP languages, rather, Business Classes may be implemented in non-OOP languages including, but not limited to, JAVASCRIPT. Business Class information and definitions are stored in a repository in a neutral format from which code can be generated in any required computer language.

A subset of characteristics unique to a specific Business Class is the relationship between the specific Business Class and a plurality of other Business Classes with which the specific Business Class interacts. Other characteristics of the specific Business Class may include attributes, specific to the Business Class, which are not dependent upon a relationship with other Business Classes.

Described herein are several methodologies involving graphical user interfaces (GUI) which, taken together, allow a user to diagram at a high level a plurality of Business Classes, the relationships between Business Classes, and sub-components of Business Classes including, but not limited to, Business Processes and Business Rules. While the following detailed descriptions of the methods by which GUIs may be utilized to perform such diagramming are presented with reference to specific examples, the present invention is not limited to such examples. Rather, the GUI interfaces described herein are intended to broadly encompass any and all graphical means by which a user may interface with a computer, or other electronic device, for the purpose of accomplishing the intended task so described.

As used herein, the term "repository" refers to any aggregation of information whereon data is stored in an electronic format and may retrieved therefrom. As used herein, "electronic format" refers to any mode of storing or manipulating data in digital form. As used herein, "neutral format" refers to a data format which is capable of being expressed in or converted to at least one other computer language including, but not limited to, object oriented computer languages.

With reference to FIG. 1, there is illustrated a graphical representation of a plurality of Business Classes, their organization, and relationships existing between them. FIG. 1 comprises a Graphical User Interface (GUI) implemented in an Object Modeler 5, through which a user may model any business or process and the attendant operation thereof. Business Classes are grouped to form Subjects. Subjects are combined to form Packages. A Package is utilized to construct a Data Repository on an electronic storage medium. In the present example there is illustrated drugstore 11. Drugstore 11 is a Package comprised of Subjects customer 13, drugstore 15, store 19, reference 17. Each Subject is further comprised of a plurality of Business Classes. A Subject represents a logical grouping of Business Classes.

With continued reference to FIG. 1, store 19 is comprised of a plurality of Business Classes such as Product 30, BeautyProduct 31, HealthProduct 32, SalesOrder 21, Shipping 23, and SalesOrderItem 25. Subject Customer 13 is comprised of, Customer 27, and CustomerAddress 29. Using the GUI interface in a point-and-click manner, a user may define and thereby create Business Classes, drag them on a display device to a desired location, and define the logical relationship between the created Business Class and the other Business Classes. Once created and physically located at a desired point on the display device, the user may define the relationships existing between the Business Class and other Business Classes in a GUI supported manner. For example, SalesOrder 21 was created and placed within store 19. A number of lines either eminating from or terminating at SalesOrder 21, with arrowheads located at at least one end of such each line's terminus, designates a relationship between SalesOrder 21 and a plurality of other Business Classes. Specifically, SalesOrder 21 can be seen to exist in relationships with SalesOrderItem 25, Shipping 23, Customer Payment 33, Customer 27, and CustomerAddress 29.

One method by which Business Classes and relationships are defined and manipulated through the use of a GUI involves selecting a Business Class object from an object palette, dragging a representation of the Business Class object to a desired location on the user's desktop, and dropping the Business Class object at the location. A palette is a collection of icons from which a user may select a desired icon. Similarly, a relationship might be selected from a relationship palette and applied to a Business Class relationship indicated by a line connecting two Business Classes. The present invention is not limited to any one methodology but is intended to broadly encompass the process of using a GUI to diagram Business Classes and their relationships on a user's desktop. A user's desktop includes, but is not limited to, the portion of a viewing monitor within which an operating system displays graphical information to a user.

As is indicated by the format of each line and the arrowheads attached thereto, the aforementioned relationships differ in substance from one another. While any method by which the nature of the lines is visually distinguishable by a user, in the present example lines are presented as either solid or dashed with the arrowheads affixed to at least one terminus of each line represented as either solid or unfilled. A solid line indicates a relationship while a dashed line indicates ownership. A solid arrowhead indicates the nature of the derivation of a relationship while an unfilled arrowhead indicates inheritance. These concepts are described more particularly below.

SalesOrder 21 has a relationship with Shipping 23 as evidenced by solid line 41 and solid arrowhead 43. As each sales order must be shipped, there is seen to be a relationship between the two Business Classes. While indicating a relationship, a solid line provides no further indication of the nature of that relationship. In contrast, dashed line 51 between SalesOrder 21 and SalesOrderItem 25 indicates ownership. The orientation of filled arrowhead 53 terminating at SalesOrderItem 25 indicates that each SalesOrder 21 owns a SalesOrderItem 25. Similarly, each SalesOrder 21 owns a CutomerAddress 29. Note that this relationship exists among Business Classes contained in separate Subjects. SalesOrder 21 is a member of store 19 while CustomerAddress 29 is a member of customer 13. Customer 27 is seen to own SalesOrder 21 via dashed line 55. Therefore, a Business class may own another Business Class as well as be owned by a third Business Class. In the present example, Customer 27 owns SalesOrder 21 and SalesOrder 21 owns SalesOrderItem 25. As will be illustrated, an ownership relationship imposes logical implications on software designed and implemented to carry out the tasks modeled in an Object Modeler.

Product 30 is modeled as possessing relationships with a plurality of Business Classes such as BeautyProduct 31 and HealthProduct 32. Unfilled arrowhead 49 at the terminus of solid line 45 connecting HealthProduct 32 and Product 30 indicate inheritance. The location of unfilled arrowhead at Product 30 indicates that Business Class HealthProduct 32 is inherited from, and is thus the child of, parent Business Class Product 30. As such, Product 30 has been defined to be a template for products. The representation of HealthProduct 32 and BeautyProduct 31 as children of Product 30 indicates that HealthProduct 32 and BeautyProduct 31 are specific instances of the more generalized Business Class 30. As such, HealthProduct 32 and BeautyProduct 31 inherit all of the attributes of Product 30. While the user will likely add additional attributes to HealthProduct 32 and BeautyProduct 31 to reflect the unique characteristics of both, both Business Classes will always contain all of the attributes of the parent Product 30.

Figure 2:
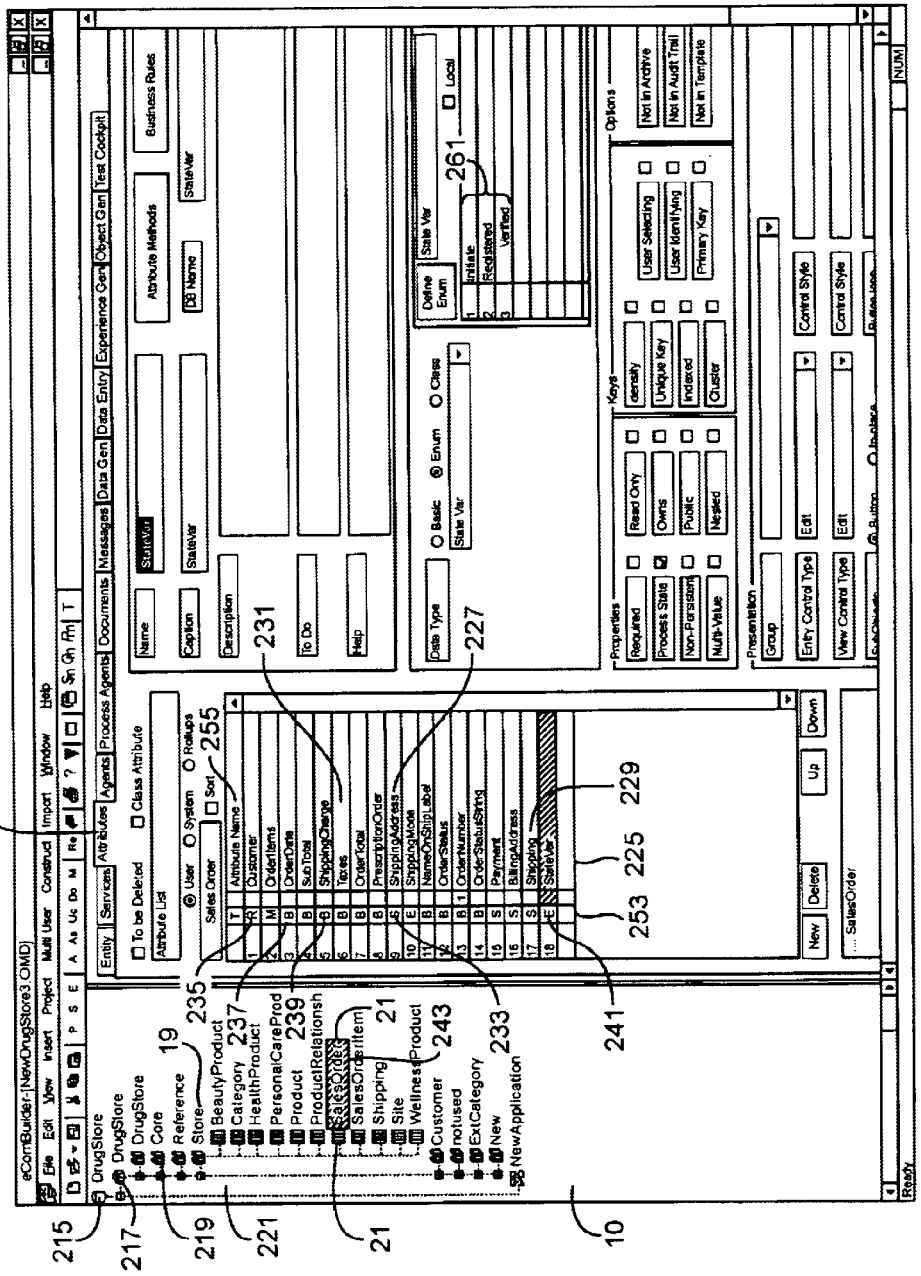
FIG. 2 is a screen rendering of an electronic form based Class Editor GUI for editing the properties of Business Classes.

The visually illustrated attributes of ownership and inheritance impose constraints on the more detailed descriptions of individual Business Classes. The present invention provides a method for translating the visual, GUI created Business Class model, into a repository based aggregation of data elements. Specifically, once defined using the GUI interface, the characteristics of each Business Class so defined are recorded in electronic format on a medium which is either centrally located or which may communicate with other like repositories. With reference to FIG. 2, the present invention comprises an electronic form or text based method for editing the properties of Business Classes. A Class Editor 211 has a class layout portion 210 and an attribute portion 225. Class layout portion 210 is comprised of a plurality of icons arranged so as to illustrate logical groupings of Business Classes. In the present example, repository icon 215 indicates a repository containing all data defining the operation of a drugstore. The drugstore repository of the present example is comprised of a single drugstore Package as indicated by package icon 217. A Package is comprised of one or more subjects. The drugstore Package is comprised of a plurality of Subjects each designated by a subject icon 219. Subject store 19 is illustrated as compromising a plurality of Business Classes. In the present example, SalesOrder 21 is designated as a Business Class by the corresponding business class icon 221. The text "SalesOrder" designating SalesOrder 21 is additionally illustrated as surrounded by a gray rectangle 243. The presence of the gray rectangle 243 is indicative of a user having selected the text through the GUI interface. Such selection may be accomplished through any appropriate means including, but not limited to, single-clicking upon the text.

Class editor 211 is comprised of a series of "tabs" such as attribute tab 251. The tabs serve to logically arrange the plurality of aspects which comprise classes including, but not limited to, subjects, packages, and repositories. With respect to SalesOrder 21, selection by a user of attribute tab 251 causes attribute table 225 to be displayed. Attribute table 225 is comprised of attribute relationship column 253 and attribute name column 255. All of the relationships described above between Business Classes that were defined visually through the GUI by a user are automatically stored in a manner which allows for textual display in attribute table 225. In addition to the information which is derived from the graphical representation of Business Classes illustrated in FIG. 1, the user may enter additional information concerning the attributes of individual Business Classes which are not derived from their relationships with other Business Classes.

Each attribute name listed in attribute name column 255 has an associated value displayed in attribute relationship column 253. Possible values for attribute relationship column 253 include "R", "M", "S", "B", and "E." While the present implementation uses the aforementioned values, any values which may be used that uniquely identify a plurality of attribute relationships. While, in the present example, attribute table 225 includes an entry for each and every Business Class for a which a relationship was defined in FIG. 1, the entry in attribute name column 255 which represents a Business Class possessing a relationship with SalesOrder 21 does not necessarily bear the same name as the Business Class defined in FIG. 1. This follows from the observation that while a single relationship may be established between two entities, the manner in which each entity views the relationship may vary.

For example, consider two persons who are married. There exists a relationship between the two persons. This relationship is optimally a one-to-one relation as each person can be married to no more than one person. The relationship of marriage is the same relationship whether viewed from the perspective of the man or the woman. However, the woman views the person with whom she has a relationship as her husband while the man views the person with whom he has a relationship as his wife. Therefore, if the man is represented as a Business Class, it is preferable to have an entry in attribute table 225 identified as wife. Conversely, the same relationship viewed through the Business Class representing the woman might have an entry for a husband. The present invention provides a method whereby every Business Class can tie a preferred name to a relationship with another Business Class.

Figure 3:
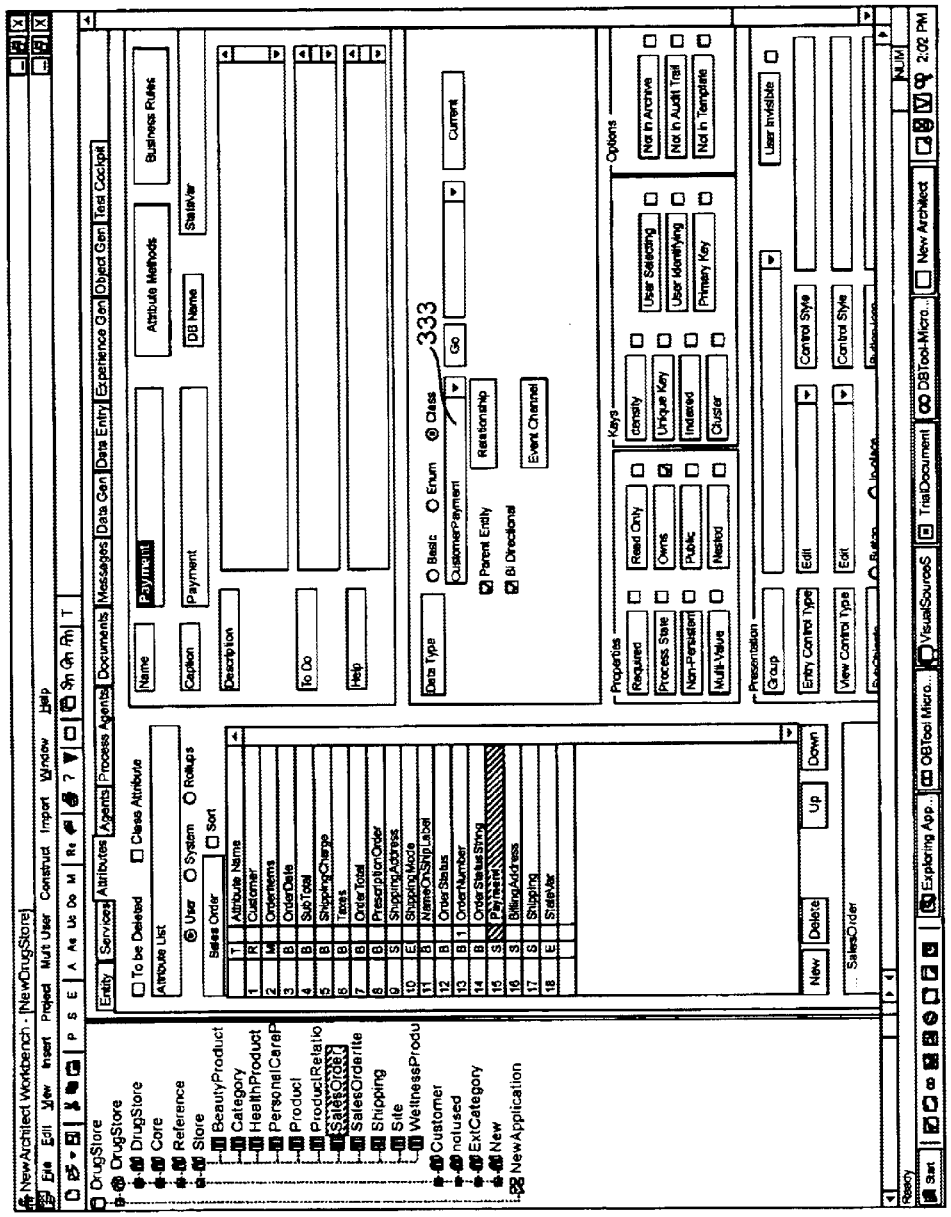
FIG. 3 is a screen rendering of a text-based methodology for displaying attribute data using the Class Editor GUI.

As is illustrated graphically in FIG. 1, each SalesOrder 21 is associated with a CustomerPayment 33. However, attribute name column 255 does not contain an entry for "CustomerPayment." As illustrated in FIG. 3, when the row in attribute name column 225 containing the text "Payment" is selected, the variable name "CustomerPayment" appears in data type entry field 333. Therefore, referring once again to FIG. 2, the "Payment" entry in attribute name column 255 refers to the relationship between SalesOrder 21 and CustomerPayment 33. It will be noted that each entry in attribute name column 255 has an associated entry in attribute relationship column 253. Every relationship between two Business Classes is bi-directional. An entry in the attribute relationship column 253 further defines the nature of the relationship.

An "M" entry indicates a one-to-many relationship. In attribute table 225, the "OrderItems" entry in attribute name column 255 indicates the relationship between SalesOrder 21 and SalesOrderItem 25. Associated with OrderItems is an attribute relationship of "M." This indicates that a single sales order can possess multiple order items.

An "S" attribute indicates a relationship with a Business Class that itself possesses an "R" attribute. Returning to the example of a male class and a female class, the function of the "S" and "R" attributes is apparent. Because each male has one and only one wife, the male class will contain a wife attribute with an "S" relationship attribute. "S" refers to single, as in each male has a single wife. The female class will contain a husband attribute which stands in reference to the wife attribute of the male class. Therefore, the husband attribute of the female class will have an "R" attribute. In addition, there may exist instances where corresponding attributes in separate classes will exhibit an attribute relationship "M" and an attribute relationship "R." In the present example, a male class may have an attribute of daughter with an "M" attribute relationship while the female class will have an attribute of father with an "R" attribute relationship. This results from the fact that a male may have several daughters while each female has one and only one father.

As noted, any number of attribute relationships may be recorded and the present invention is not limited to those described. Rather, any relationship between Business Classes which may be conceived and which serves to define the operation of a Business Class may likewise be captured through the GUI, stored on the repository, and used to generate code and various other data entities related to the Business Class so defined.

Referring to FIG. 2, attribute name "Customer" entered in attribute name column 255 has an associated attribute "R" 235. Attribute name "ShippingAddress" entered in attribute name column 255 has an associated attribute "S" 235. Therefore, SalesOrder 21 relates back to Customer 27 while CustomerAddress relates back to SalesOrder 21.

The attribute "B" refers to a basic data type. A basic data type is usually implemented in computer code as a numeric value including, but not limited to, integers and floating point numbers. In addition, a basic type may be comprised of a byte sequence representing text. The attribute "E" refers to an enumerated data type. Enumerated data types contain integer values with each unique integer value representing a state as illustrated more fully below. Note that in FIG. 2, attribute name "StateVar" entered in attribute name column 255 has an associated attribute "E" 235. The gray area surrounding the text "StateVar" indicates that a user has selected the entry by clicking on the text or though other appropriate means. As a result of the selection, data type information is displayed in data type table 261. There is illustrated enumerated values of "1", "2", and "3" associated with states "Initiate", "Registered", and "Payment Processed" respectively.

Figure 4:
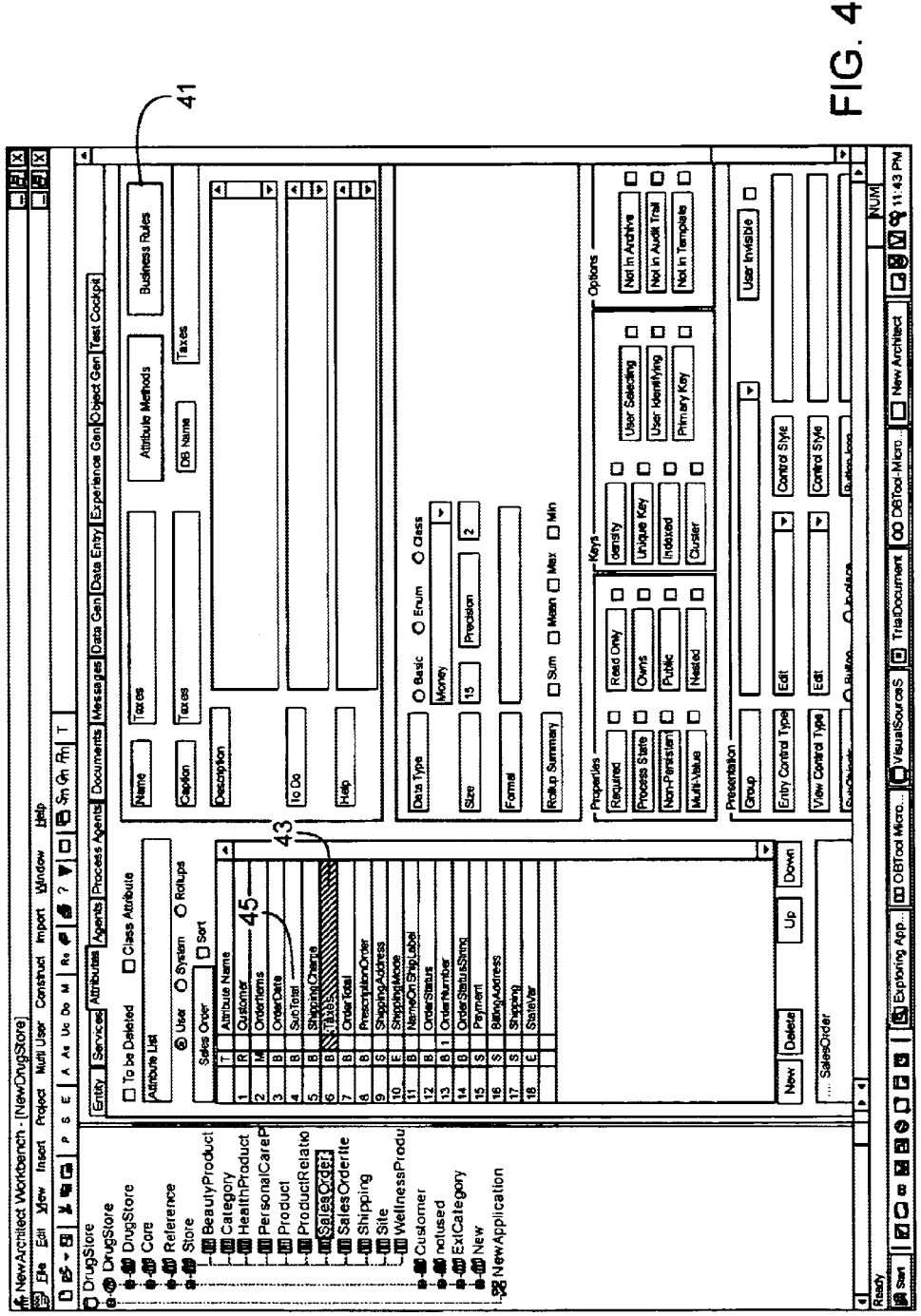
FIG. 4 is a screen rendering of the Class Editor GUI of FIG. 2 illustrating class attributes and their attendant business rules.
Figure 5:
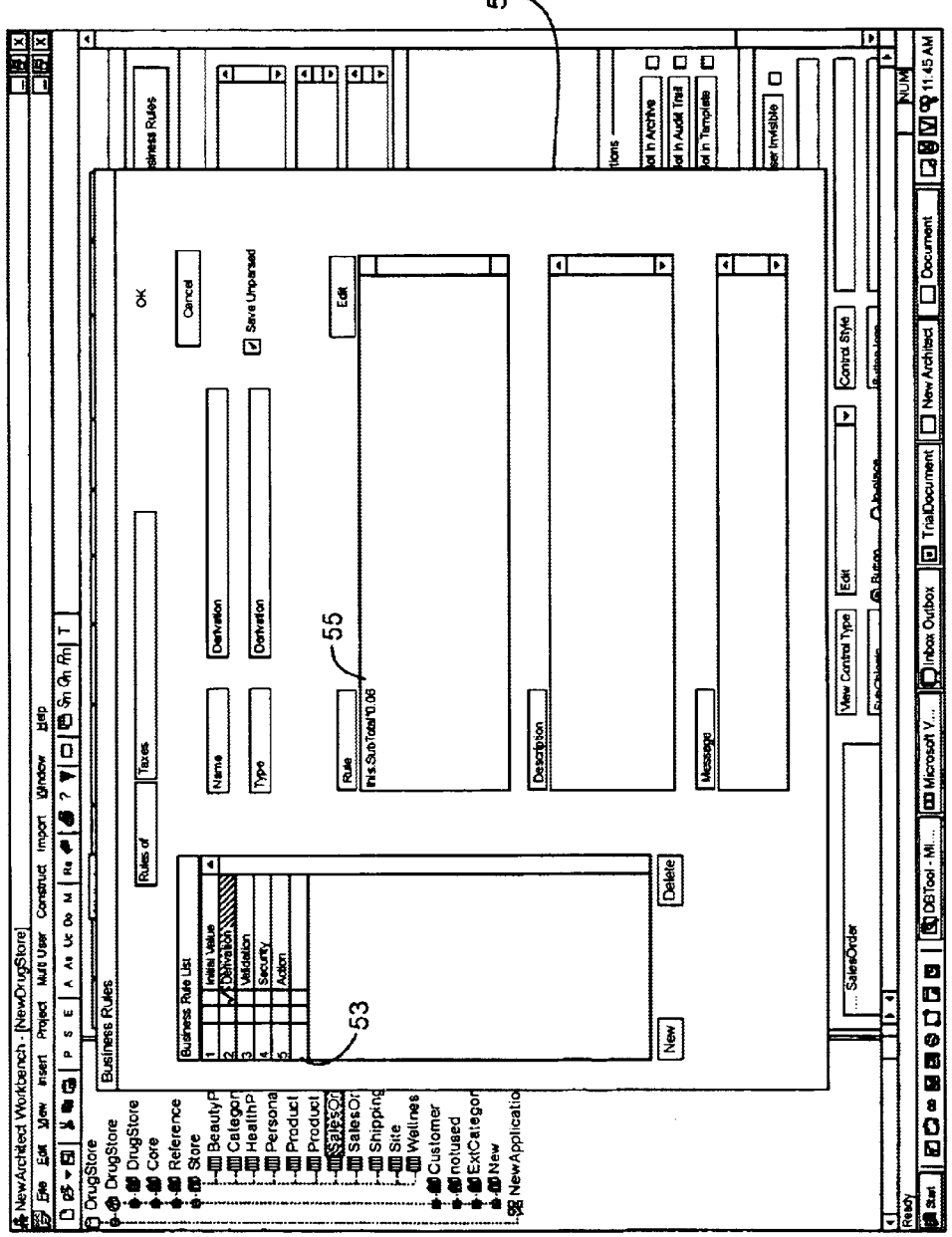
FIG. 5 is a screen rendering of the business rule portion of the Class Editor GUI of FIG. 2.

A basic data type, such as "Taxes", may have one or more associated Business Rules. Business Rules are tied to attributes. With reference to FIG. 4, attribute "Taxes" has been selected and appears highlighted. As a result, Business Rule button 41 is re-plotted with the annotation "(1)." If more than one Business Rule were associated with "Taxes," the annotation appearing in Business Rule button 41 would reflect the number of Business Rules so associated. Clicking on Business Rule button 41 invokes Business Rule window 51 as illustrated in FIG. 5. Business Rule window 51 is comprised of Business Rule table 53 and business rule 55. Business Rule table 53 lists five types of Business Rules including, but not limited to, "Initial Value", "Derivation", and "Validation". An example of an initial value Business Rule would be "this.Quantity=0". An example of a validation Business Rule might consist of the following code:

```
If(this.Quantity>0)
    return TRUE;
else
    return FALSE;
```

An example of a derivation Business Rule might consist of the following code:

```
this.Quantity1=this.Quantity2*this.Quantity3;
```

A Business Rule is comprised of logic which contains sufficient structure to enable the generation of computer executable code to perform the defined functionality. An example of such exemplary code is "this.SubTotal*0.06". Business Rules may be tied to an entire Business Class, and hence to all Business Objects derived therefrom, or to an individual instance of a Business Class.

In the present example, business rule 55 is comprised of the following logic: "this.SubTotal*0.06". Because business rule 55 is of type "Derivation," the logic serves to specify how the value of taxes attribute is derived or computed. Using logic descriptors similar to the syntax of C++, business rule 55 states that the value of taxes attribute 43 is to equal the value of attribute subtotal 45 multiplied by 0.06. Attribute subtotal 45 may itself derive its value from a Business Rule which states a dependence on one or more other attributes. As illustrated, all SalesOrder Business objects derived from the SalesOrder Business Class will inherit the described taxes business rule 55. However, it is preferable to have a method by which the individual attributes of Business Objects are derived and processed different from one another based upon the unique characteristics of the Business Object. The present invention allows for the incorporation into a Business Rule of logic which is specific to a particular instantiation of a Business Object.

For example, to calculate a separate discount rate for businesses purchasing goods from a particular web site one could code a derivation Business Rule which would return a different discount rate based upon the identity of the buyer. Such a Business Rule might appear as follows:

if this.customer="Joe"
        then this.discount=0.06;
    else if this.customer="Fred"
        then this discount=0.09;
    else if this.customer="John"
        then this.discount="0.03";

In this manner, different customers would receive different discount rates. However, such a methodology relies on hard-coding the identity of customers and their attendant discount rates. Using such a methodology presents challenges when a new customer is added. Specifically, such a methodology requires that the Business Rule within which each separate discount rate is specified contains a hard-coded algorithm for deriving the appropriate discount rate for a given customer. If in the future another customer were added, it would be necessary to re-code the Business Rule to include new discount rate derivation code, regenerate the run time application components of the architecture, and redistribute the new components. Such a process requires considerable new code to be added to an existing architecture requiring potentially laborious testing.

The present invention avoids these drawbacks by allowing a reference in a Business Rule to a row and column in a relational database associated with a defined attribute. While the present invention is illustrated herein with reference to a relational database, the present invention is drawn broadly to the use of any form of memory storage capable of receiving a request for data based upon identifying criteria and returning the data so requested. In this manner, one is able to locate a portion of the logical code comprising a Business Rule outside of the Business Rule definition contained in a Business Class. When such a Business Rule is invoked at run-time, the referenced portion of the Business Rule located externally in the relational database is retrieved and executed. Such execution may consist of interpreting the code or compiling and subsequently executing the code. The result of such a method is the ability to change the functionality of a statically defined Business Rule based upon the identity of a customer or other Business Class attribute.

As has been illustrated, the attributes corresponding to a Business Class fall generally into two groups, those which can be derived from the graphic representation of Business Class relationships as illustrated in FIG. 1, and those which must be manually defined. Regardless of which of the two types into which an individual attribute falls, Business Rules may be defined and tied to the attribute. Regardless of whether a Business Rule accesses the values of other attributes, each Business Rule is tied to one and only one attribute. In contrast to the attribute dependent nature of Business Rules, there exists Business Class level Business Processes which are tied to individual Business Classes. Like Business Classes, however, a portion of the logic required to implement Business Processes may be derived from a graphical representation of the relationship between Business Processes.

Figure 6:
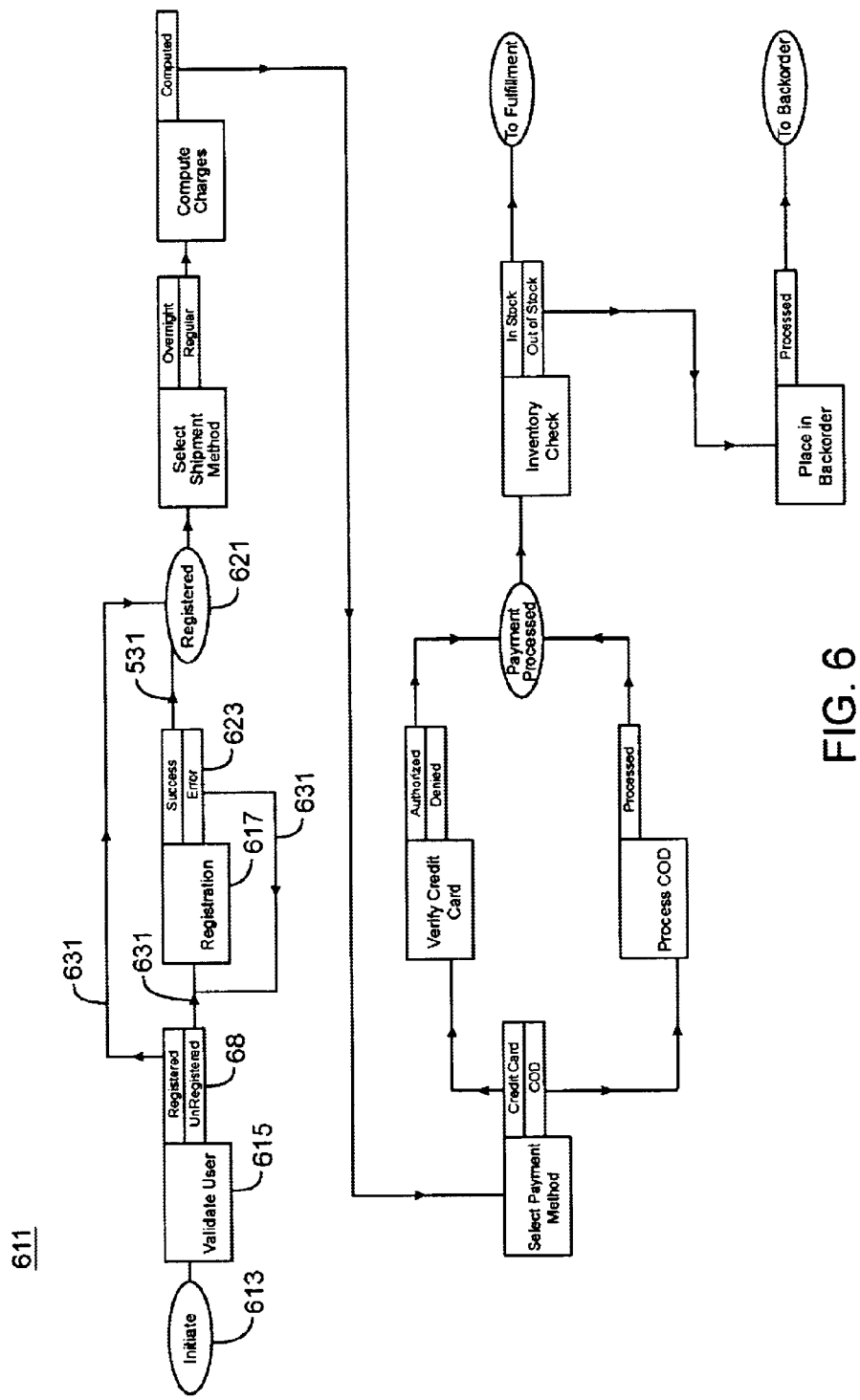
FIG. 6 is a screen rendering of a Business Process Editor GUI.

Business Processes are comprised of states and subprocesses, may be comprised of one or more Business Methods, or may consist of one or more manual processes. A state is the present condition of a Business Class. As detailed with reference to FIG. 2, attribute "StateVar" is an enumerated data type where possible states include "Initiate," "Registered," and "Payment Processed." Subprocesses consist of the logic or operations required to move a Business Class from state to state. FIG. 6 illustrates the GUI interface for the present invention's Business Process Editor 611. Business Process Editor 611 allows the user to define states 613, and 621, Subprocesses 615 and 617, and the states 619, 623 which result from the operation of Subprocesses. Focusing on a portion of the state diagram illustrated in Business Process Editor 611, the user has created elliptical state icons 613 and 621, rectangular Subprocess icons 615 and 617, and rectangular state icons 619 and 623 attached thereto. Such shapes are exemplary and not required. The portion of the Business Process thusly comprised illustrates the initial state of the Business Class SalesOrder shown as initiate state 613, and the Business Methods validate user 615 and registration 617 required to move Business Class SalesOrder to registered state 621.

As is illustrated, the user has created an icon and assigned a textual attribute of "initiate" to form initiate state 613. Next, the user defined two Business Methods in series with initiate state 613 and connected by arrow lines 631. The Business Methods were next assigned the textual attributes of "Validate User" and "Registration" to form validate method 615 and registration method 617. Associated with each method 615, 617 are the states resulting from the operation of the methods. In the present example, the user has defined two possible outcomes for validate method 615: registered or unregistered. Similarly, the user has defined two possible outcomes for registration method 517: success or error. Connected to registration method 617 via arrow line 631 is registered state 621. Each arrow line 631 indicates the direction of logical flow of the Business Process. In the present example a sales order with a state of "initiate" proceeds to validate the user. The diagram of FIG. 5 illustrates that the process of user validation will be accomplished through the implementation of a Business Method identified as validate method 615. Upon completion of performing validate method 615, the state of the user will be either "registered" or "unregistered". If the result is "registered," the logical flow continues, via arrow line 631, directly to registered state 621. If the result is "unregistered," the logical flow continues to registration method 617. Upon completion of performing registration method 617, the state of the registration will be either "success" or "error". If the result is "success," the logical flow continues, via arrow line 631, directly to registered state 621. If the result is "error," the logical flow continues to perform once again registration method 617.

In a manner similar to that illustrated with reference to FIG. 1 and Object Modeler 5, Business Process Editor 611 allows a user, through the utilization of a GUI, to define the logical relationship between entities. While Object Modeler 5 allows the user to define the relationship between Business Classes, Business Process Editor 611 allows the user to define the relationship between Business Class states and Business Methods. In addition, Business Process Editor 611 also allows for the conversion of user defined graphical relationships into detailed, logical abstractions which facilitate the creation of computer code necessary to perform the Business Process so defined.

Figure 7:
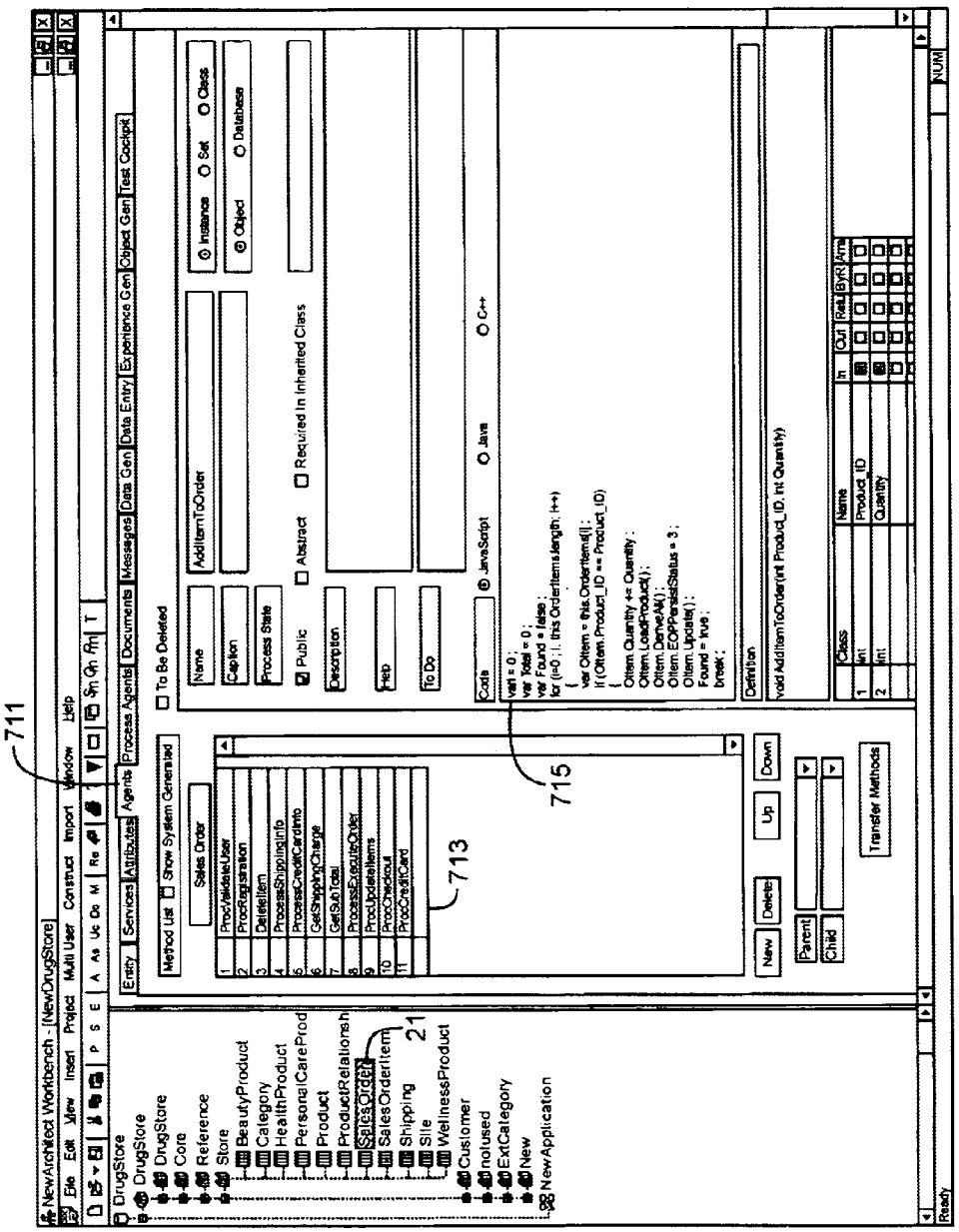
FIG. 7 is a screen rendering of a GUI utilized to display Business Methods.

As described above with reference to FIG. 2, there is illustrated attribute name "StateVar" entered in attribute name column 255 with an associated attribute "E" 235. There is additionally illustrated enumerated values of "1", "2", and "3" associated with states "Initiate", "Registered", and "Payment Processed" respectively. These states were derived from the graphical description of the Business Process illustrated in FIG. 6. With reference to FIG. 7, there is illustrated the GUI utilized by a user to define Business Methods. Note, as with FIG. 2, SalesOrder 21 is selected. Once selected, the user may click, or otherwise select, agents tab 711 to display Business Method information. Selecting agents tab 711 causes Business Method table 713 and Business Method code window 715 to be displayed. Business Method table 713 lists all Business Methods associated with SalesOrder 21. Some of these Business Methods are derived from the relationships specified graphically in Business Process Editor 511 and some are user defined Business Methods not derivable from information entered into Business Process editor 511. Still other Business Methods are derived from the Business Class relationships specified in Object Modeler 5 as illustrated in FIG. 1.

With reference to FIG. 7, there is seen Business Method table 713. Business Method table 713 is comprised of multiple Business Methods. Among these Business Methods are "ProcValidateUser" and "ProcRegistration." ProcValidateUser and ProcRegistration refer to validate method 615 and registration method 617. As a result of the user defining validate method 615 and registration method 617 using Business Process Editor 611, the names of the methods 615, 617 appear in Business Method table 713. The gray rectangle surrounding the text "ProcValidateUser" indicates that the user has selected the first row of the Business Method table 713. As a result of the selection, the code which forms the substance of validate method 615 appears in Business Method code window 715. If code associated with validate method 615 has been previously entered into Business Method code window 715, the code will appear in Business Method code window 715. In addition, code may be added or modified by altering the contents of Business Method code window 715.

In addition to the Business Methods whose names are automatically generated based upon the inputs to the Business Process Editor 611, the present invention can generate both entries and the attendant code for other standard Business Methods. As mentioned, each attribute comprising a Business Class may have a validation Business Rule associated with it. Such a Business Rule provides logic for determining the validity of the attribute to which it is tied. However, Business Rules can only be tied to single attributes. Business Methods, on the other hand, are tied to Business Classes and, as such, may operate on one or more attributes. Because of this property, it is possible to generate a plurality of Business Methods. For example, there can be generated, and the present invention does generate, a Business Method which automatically invokes the validation Business Rules tied to each attribute in order to establish a Business Class validation.

In addition to creating standard attribute validation, the present invention is capable of generating Business Methods to perform Business Class management functions. Such functions manage the allocation of memory comprising the persistent and transient electronic data storage space which define the run-time characteristics of a Business Class. As illustrated in FIG. 1 and discussed above, SalesOrder 21 has a one-to-many relationship with SalesOrderItem 25. That is to say that one SalesOrder 21 may have a plurality of SalesOrderItems 25. While not illustrated herein, it is likewise possible that each SalesOrderItem 25 could have a one-to-many relationship with another Business Class. If, while executing the Business Process comprising the SalesOrder Business Class, it becomes necessary to abort the processing of a sales order, it is preferable to be able to delete all the dependent instances of Business Classes which have been created and are in existence. It is therefore one aspect of the present invention to automatically generate for each Business Class the Business Methods required to handle the deletion of dependent Business Classes and their attendant data.

The present invention allows the user to define each Business Class as being of type "restrict" or type "cascade." If a Business Class is of type "cascade," the run-time embodiment of the Business Class, when no longer valid, will propagate the requirement of deleting dependent Business Classes. As each dependent Business Class may itself comprise further dependent Business Classes, the deletion logic will propagate in tree like fashion from the original Business Class to the last Business Class or Classes dependent thereupon. If, conversely, a Business Class is of type "restrict," the run-time embodiment of the Business Class, when no longer valid, will not proceed to extinguish itself if there are existing Business Classes dependent thereupon.

Figure 8:
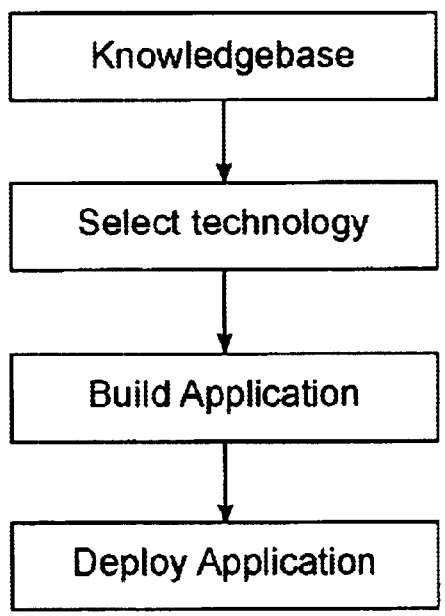
FIG. 8 is a flow chart of the code generation process of the present invention.

The present invention automatically generates Business Methods for each Business Class to allow for the management of Business Class deletions. The generation process flows sequentially from the repository in which are stored the Business Classes comprising an application to the run-time components capable of deployment throughout the architecture on which they are to run. The Business Class definitons residing in the repository form an integrated description of the business model referred to as a knowledge base. Once the knowledge base is created, technology choices, or selections, are inputed to direct the generation of individual run-time components. For example, a user might designate the generation of C++ code and JAVASCRIPT code to be generated for distribution to different platforms. Once the technology is selected, the present invention proceeds to translate the neutral code of the Business Classes into the designated technology specific language thus building the completed run-time application which forms the output of the present invention. In addition, the process of building the application may include the additional step of compiling the generated run-time components to create executable code. After building the application, the generated and executable components are deployed to the platforms upon which they will execute. This process of code generation is graphically depicted in flow chart form with reference to FIG. 8.

The code comprising each such Business Method is generated for inclusion by the user into other Business Methods. The generated code allows for the deletion of both the persistent and the non-persistent, or transient, data which comprises a Business Class. As noted, a Business Class forms the template for a particular run-time Business Object. The Business Object is an instance of the Business Class.

A Business Object, when implemented in computer code forming the run time manifestation of the Business Object, comprises persistent and transient representations. For example, there may exist an instance of the SalesOrder Business Class representing an actual run-time sales order. This sales order Business Object, comprising attributes and the attendant functionality required to implement the defined Business Processes and Business Rules, is located in a defined portion of memory in an electronic storage device. This portion of memory may consist of, but is not limited to, the RAM memory of the user's computer. This memory space is likely comprised of contiguous memory addresses and may be allocated and de-allocated as required by the operating system on the user's computer. While the values stored in the memory space comprised of the structure of the sales order Business Class may change, the amount of memory initially allocated is unlikely to do so. For example, when a derivation Business Rule associated with an attribute of a Business Object is invoked, the resulting value is stored in the corresponding attribute variable of the Business Object. While the value in memory may be changed by such an operation, the amount of memory space is unchanged. If the entire memory space containing the structure of the individual Business Object were de-allocated, as when the Business Object is deleted, the Business Object would cease to exist.

However, there is additionally data associated with a Business Object that may persist even after the memory space comprising the Business Object is de-allocated. For example, a SalesOrder Business Object may keep track of the sales items of which it is comprised by storing tabular information in a relational database or other suitable data storage medium. When the transient memory space comprising the Business Object is de-allocated, this tabular data will persist. In many instances, it is the tabular data associated with a Business Object that is most important to delete when the instance of the Business Object is no longer required. Therefore, the present invention automatically generates Business Methods to de-allocate the memory storage space comprising the transient Business Class data as well as those necessary to delete the non-persistent data. Examples of the later Business Methods may include, but are not limited to, SQL statements.

In addition to the aforementioned methodologies for entering Business Rules and Business Methods, the present invention provides a methodology for defining and generating web pages in a fashion which is fully integrated with the definition of other Business Class attributes.

Figure 9:
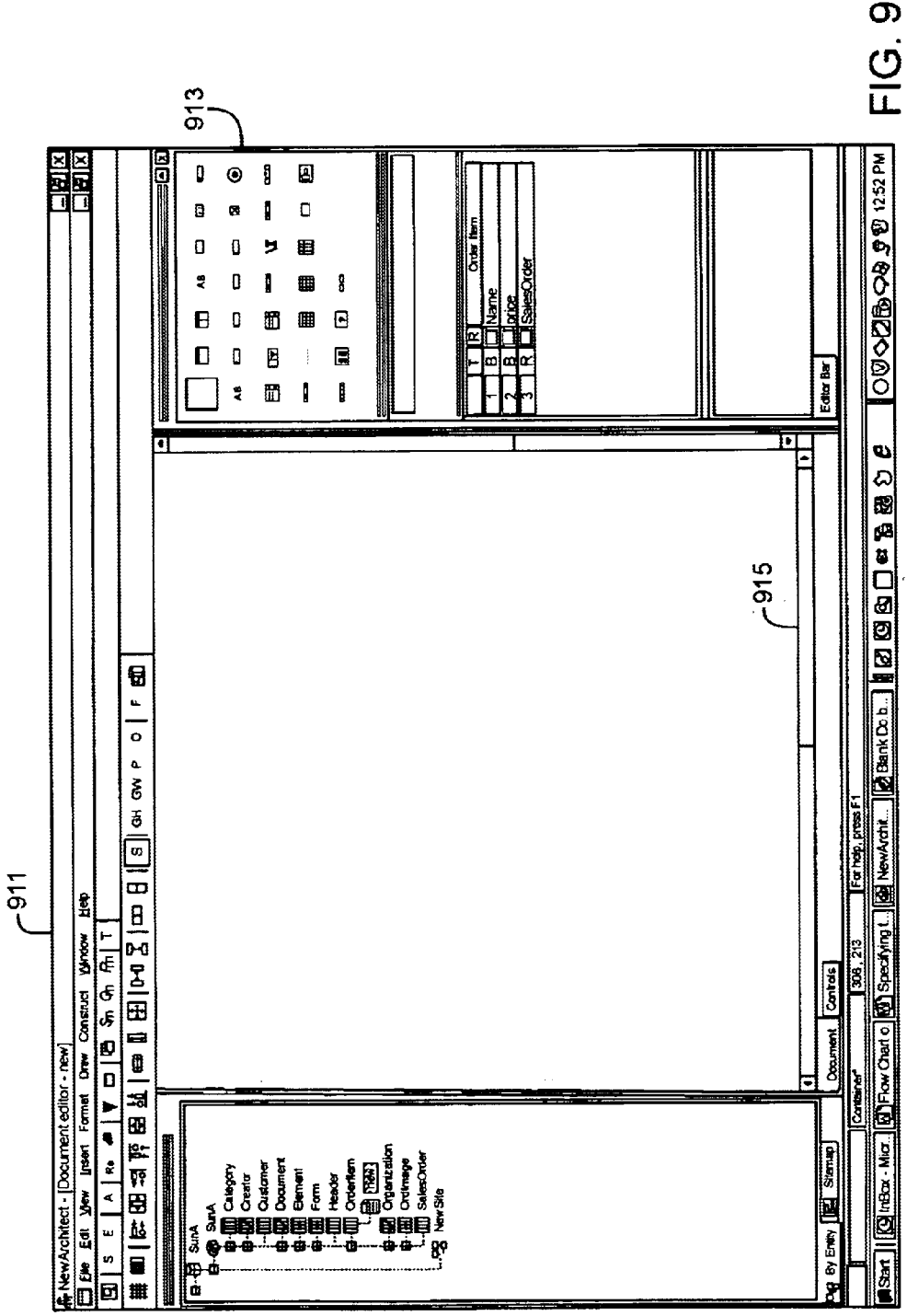
FIG. 9 is a screen rendering of the web page editor of the present invention.

With reference to FIG. 9 there is illustrated the GUI comprising, in part, web page editor 911. Web page editor 911 consists of web page space 915 representing the space upon which graphic and textual elements may be added so as to design a web page. Element selection menu 913 is a collection of icons representing different graphic and textual elements. As shall be more fully illustrated below, elements selected from element selection menu 913 can be selected and placed upon web page space 915 to design and define the layout of a web page.

Figure 10:
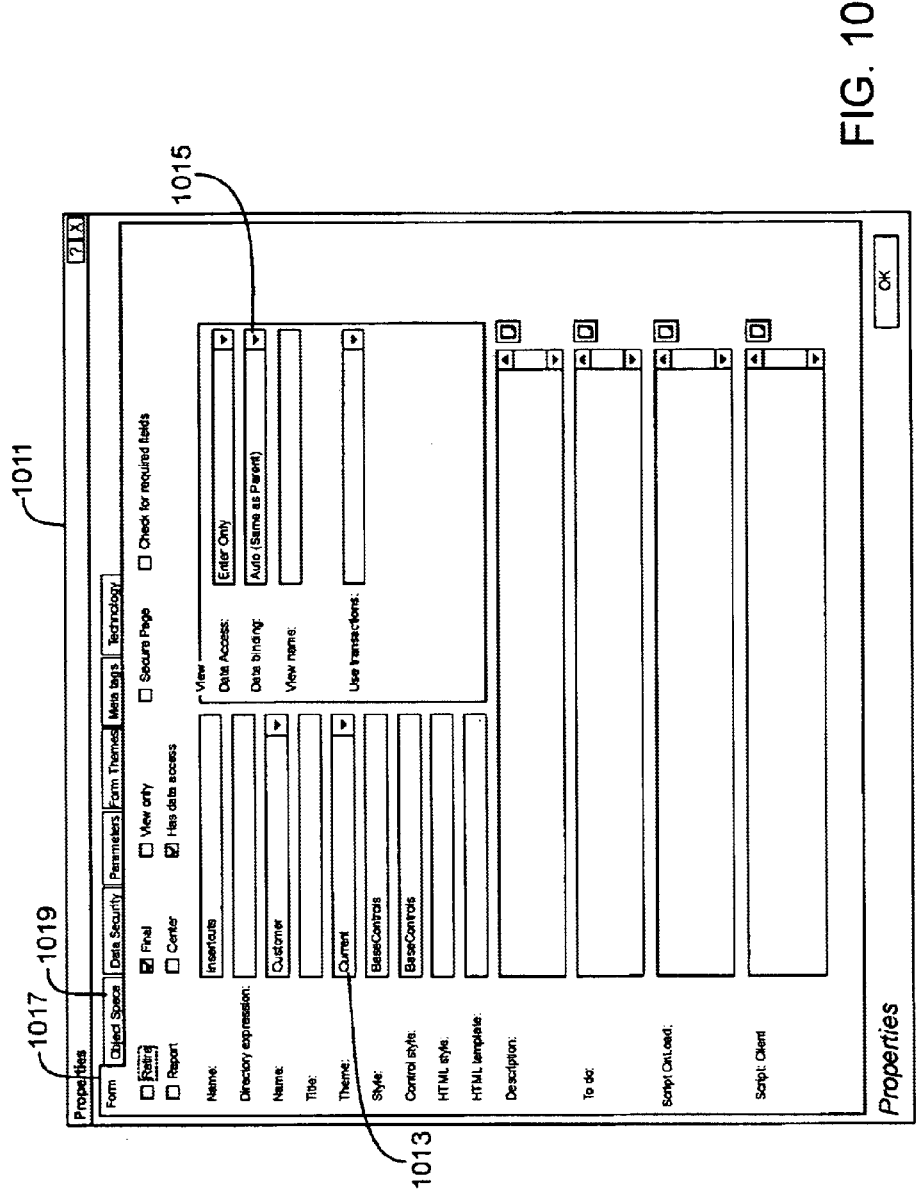
FIG. 10 is a screen rendering of the web page property editor of the present invention showing the form specified attributes.

After entering web page editor 911, the present invention allows definition at the micro and macro levels of the attributes which define the web page as a whole and each graphic or textual element individually. Referring to FIG. 10, there is illustrated web page properties editor 1011. Web page properties editor 1011 may be invoked from the web page editor 911 of FIG. 9 in any of a number of appropriate manners including, but not limited to, clicking on a push button or selecting a tab.

Once web page properties editor 1011 is invoked, there is provided a series of tabs such as form tab 1017 and object space tab 1019. In the present example, form tab 1017 has been selected and as a result a series of entry fields are displayed into which customizing data relating to the web page can be entered. Selecting any of the tabs will invoke a separate window interface through which information about the web page or one of its elements may be entered. A variety of input fields, such as exemplary input field 1013, is included within web page properties editor 1019. In the present instance, there are displayed a plurality of input fields through which there can be defined a plurality of web page attributes including, but not limited to, a web page's name, title, theme, and style. While illustrated herein with a variety of specific input fields, the present invention is drawn broadly to the inclusion of any and all input fields, of any appropriate construct, which allow the definition of web page attributes. Of note is data binding input field 1015 wherein can be entered the mode by which the web page is to be created and accessed.

Figure 10A:
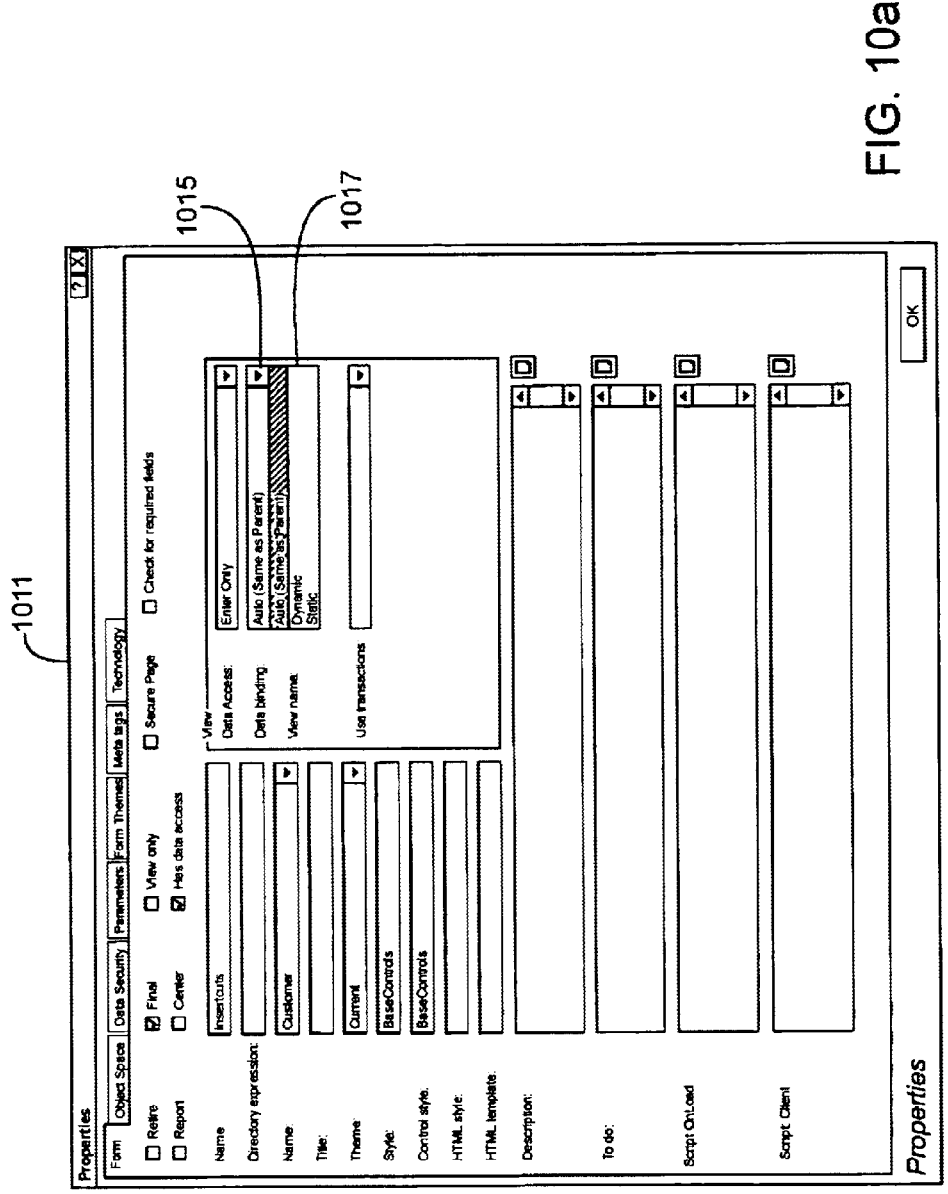
FIG. 10a is a screen rendering of the web page property editor of FIG. 10 illustrating the data binding menu.

With reference to FIG. 10a, there is illustrated data binding input field 1015 as a drop down list box 1017. Possible selections include "dynamic", "static", and "auto". Selection of static binding will allow the run-time architecture to dynamically update the code comprising the web page at predefined intervals allowing the web page to be stored and accessed as a static web page. Selection of dynamic data binding will provide through the generation of web page code, such as HTML code, of a web page which may be accessed through the run-time architecture. Selection of auto data binding will ensure that the web page is generated according to the same data binding option selected in the Business Class in which the web page resides.

Figure 11:
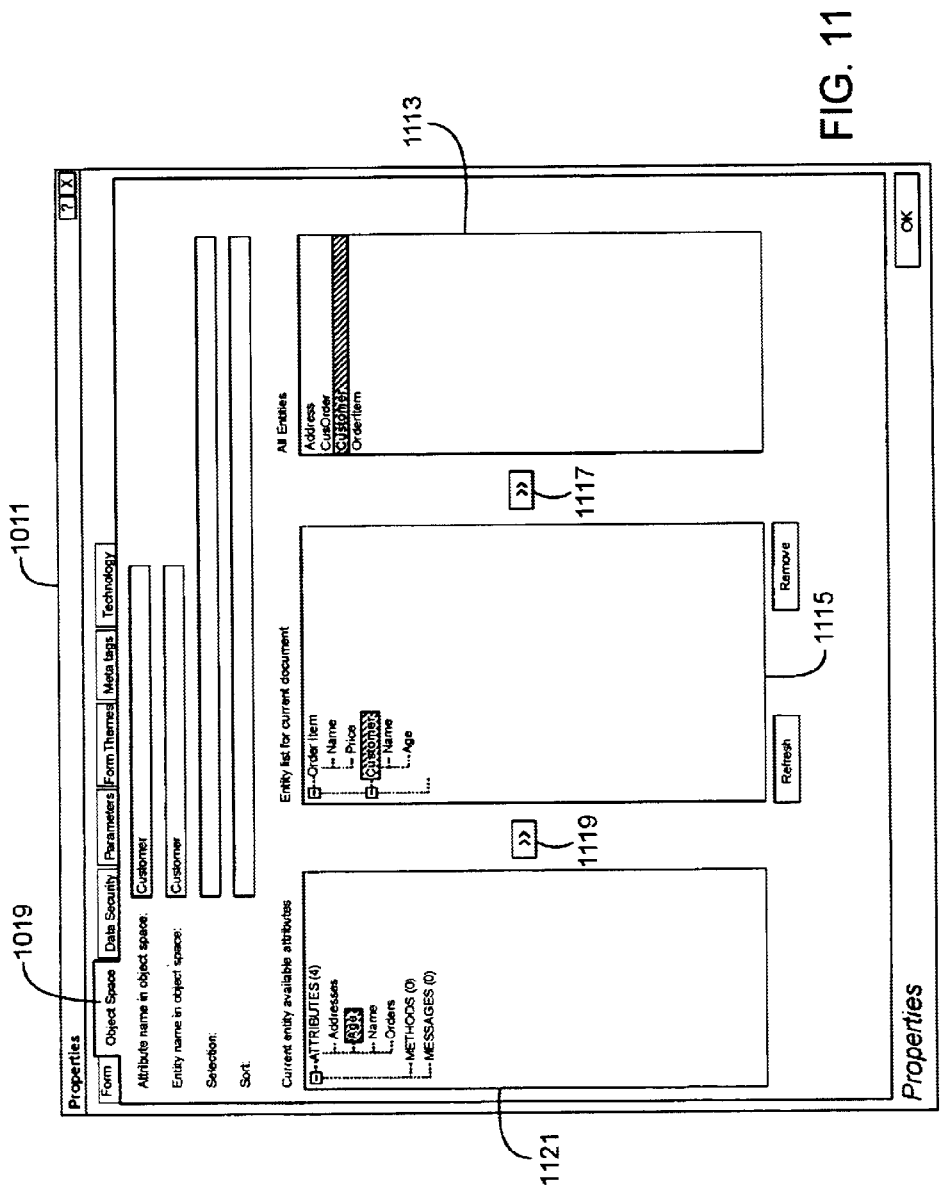
FIG. 11 is a screen rendering of the web page property editor of the present invention showing the object space specified attributes.

The present invention allows for, but does not require, the definition of the object space associated with any web page. As used herein, "object space", refers to the subset of attributes, methods, and rules contained in one or more Business Class definitions which defines the specific functionality required to perform a discreet business function. Use of an object space obviates the difficulties inherent in web based transactions arising from the stateless nature of web based communications. With reference to FIG. 11, there is illustrated web page properties editor 1011 after selection of object space tab 1019. Displayed are entity selection window 1113, available attribute window 1121, current entity window 1115. Data is moved from one window to another through the use of add entity button 1117 and add attribute button 1119. In the present example Business Class customer has been selected and appears highlighted in entity selection window 1113. Once a Business Class has been selected, clicking on add entity button 1117 causes all of the attribute, methods and messages of the selected Business Class to appear in available attribute window 1121. Once included in available attribute window 1121, selecting an attribute, method, or message followed by clicking on add attribute button 1119 will add the selected attribute to current entity window 1115. Current entity window 115 contains all of the attributes, methods, and messages which comprise the object space associated with the web page. As used herein, a message refers to a sequence of one or more bytes of data which, like a web page definition, has an associated format and object space and may interact with other Business Classes or external code.

Figure 12:
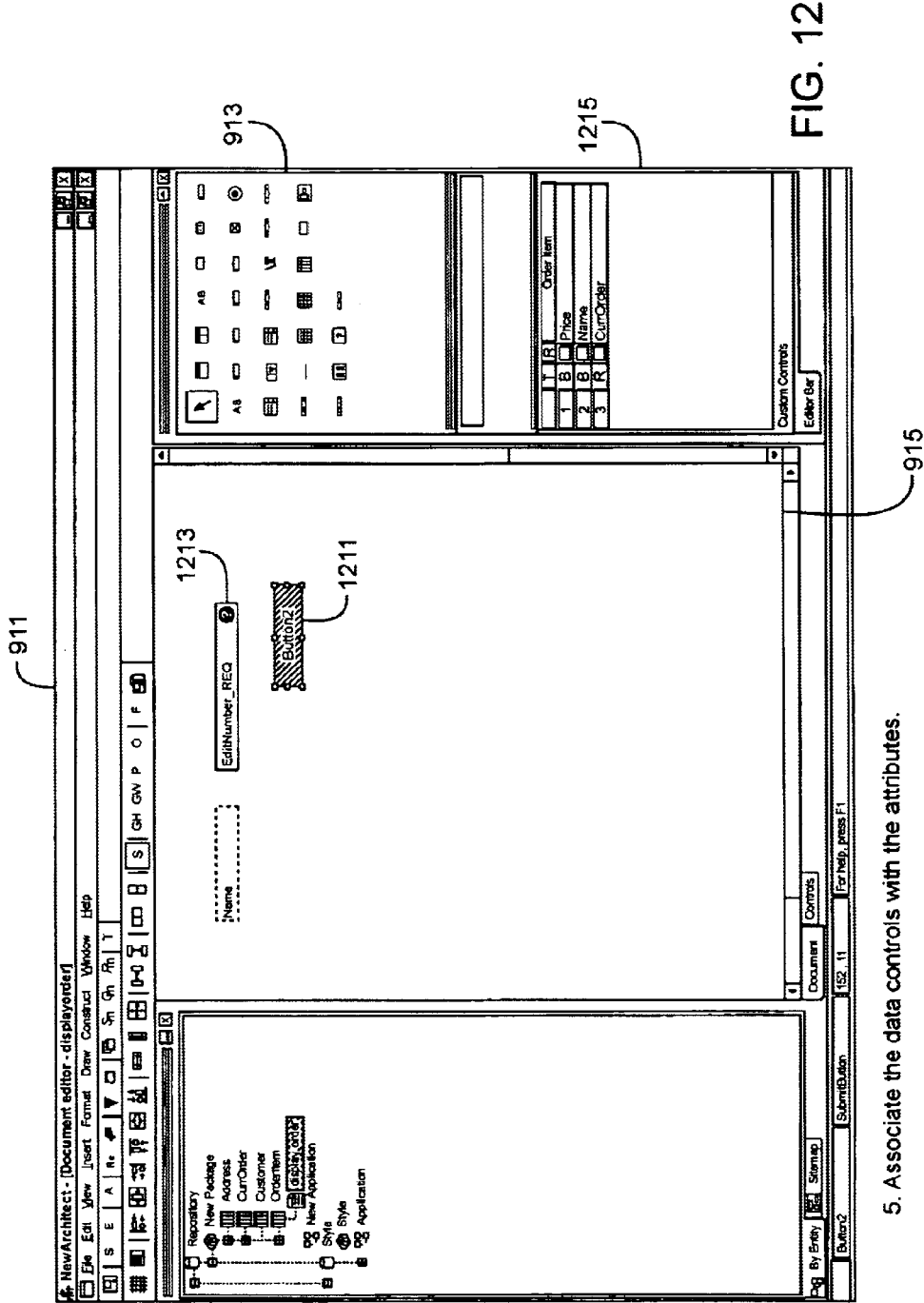
FIG. 12 is a screen rendering of the web page editor of the present invention illustrating the selection and placement of graphical and textual elements.

Whether or not an object space is defined, it is necessary to return to the web page editor 911 of FIG. 9 and to design the web page by placing graphic and textual elements on the web page and associating each element with a Business Class attribute definition. With reference to FIG. 12, there is illustrated web page editor 911 after selection and positioning of exemplary text field 1213 and button 1211 on web page space 915. One method of accomplishing such selection and positioning involves clicking on the icon in element selection menu 913 that corresponds to the element to be placed upon web page space 915 and then clicking on the desired location in web page space 915 where the chosen element is to reside. Once placed in this manner, the element, such as text field 1213 and button 1211, may be selected and moved around web page space 915 as desired in accordance with any of a number of methodologies, including but not limited to, dragging and dropping the element at a new location.

Once graphic and textual elements have been added, their properties must be defined. Note that in the present example attribute window 1215 contains data previously selected when defining the web page's object space. Through any appropriate manner of clicking on a single element in attribute list window 1215 and an element such as text field 1213, the attribute definition of a Business Class attribute may be linked to graphic or textual element on web page space 915. In this manner, information contained in a Business Class definition is automatically linked to the web page element. As mentioned, while an object space may be defined for web page before adding elements to the web page space 915, it need not be predefined. In the present example, the specialized attributes which define the operation of a web page element may be entered without reference to an existing Business Class. In the present invention, one may invoke a control properties window to enter data particular to a specific element or control.

Figure 13:
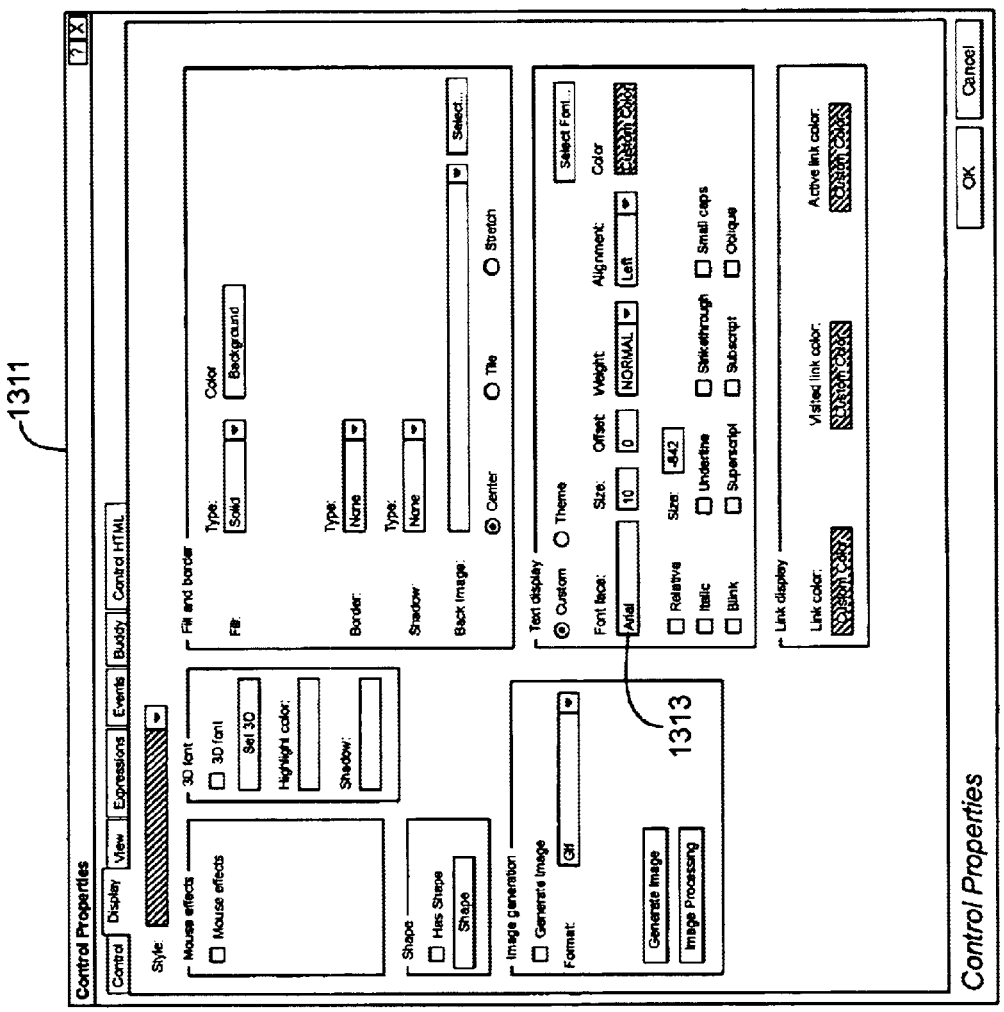
FIG. 13 is a screen rendering of the control property window of the present invention.

With reference to FIG. 13, there is illustrated the control property editor of the present invention. Invoked by the selection of an element placed in web page space 915 of FIG. 9, control property window 1311 allows for the entering of attributes which define the appearance and operation of an element. For example, control property window 1311 is comprised in part of exemplary entry field 1313 into which a font type is entered. The present invention is drawn broadly to any and all assemblages of entry fields or other data entry elements through which the appearance and operation of any and all types of graphic or textual elements may be defined.

Figure 14:
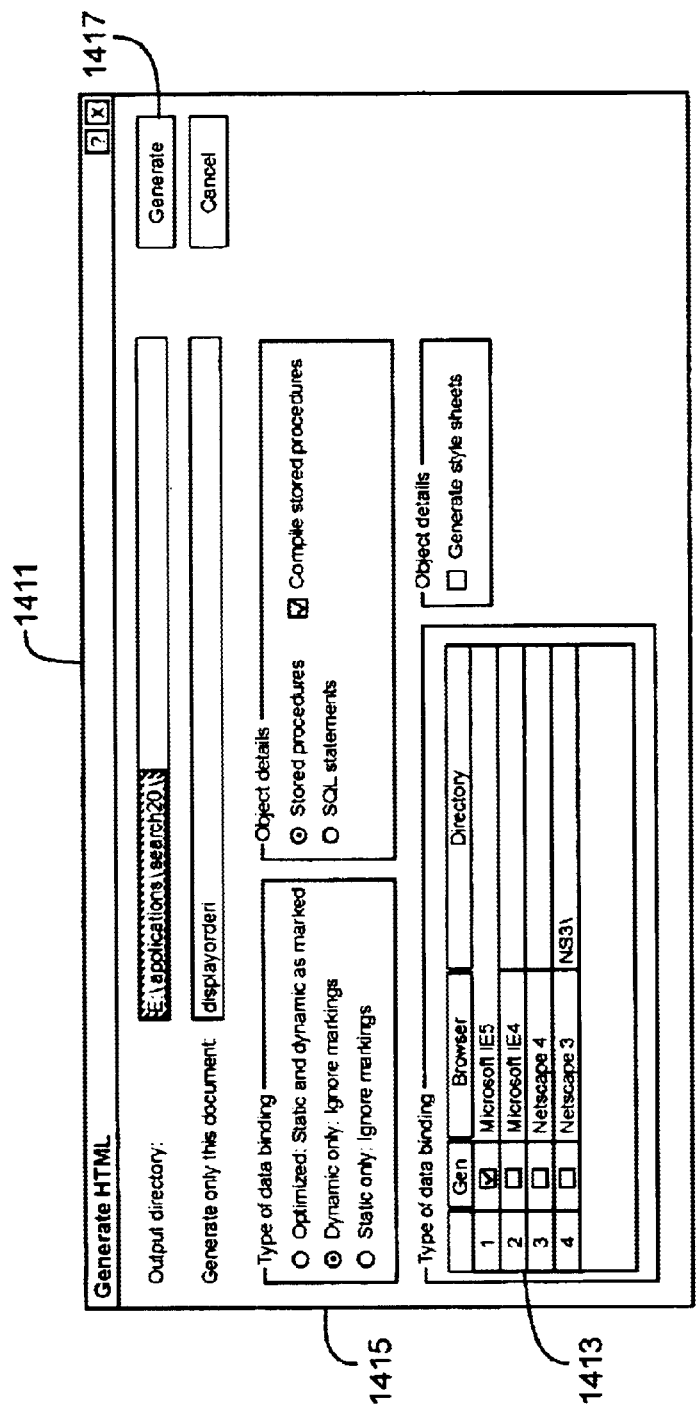
FIG. 14 is a screen rendering of the generate HTML window of the present invention.

Once the attributes of the web page and each element of the web page have been defined, the code for each web page may be generated. With reference to FIG. 14, there is illustrated generate HTML window 1411. While illustrated with reference to generating HTML code, the present invention is drawn broadly to the generation of any and all web based programming languages. Generate HTML window 1411 includes data binding selection 1415 and target browser 1413. Once the method of data binding is selected through the use of data binding selection 1415 and the target browser is selected through the use of target browser 1413, clicking on generate button 1417 will cause the web pages defined by the present invention to be generated into runtime code reflecting the defined appearance and functionality of the web pages so defined.

Figure 15:
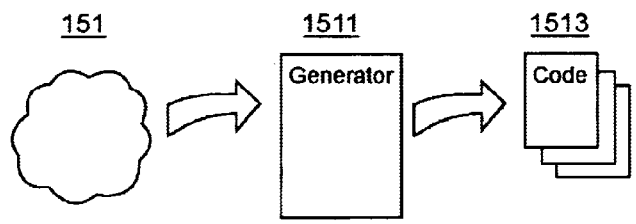
FIG. 15 is a schematic diagram of the architecture compnents of the present invention.

With reference to FIG. 15, code generator 1511 is invoked from knowledge base 151 to produce computer code 1513. Knowledge base 151 is comprised of a centralized repository of the present invention and contains detailed definitions of Business Classes which define a universe of system functionality. Code generator 1511 resides on a platform with connectivity to knowledge base 151. As used herein, "connectivity" refers to any method by which electronic data may be transmitted including, but not limited to, internet and wireless connections.

Code generator 1511 consists of self-contained executable computer code that receives requests from knowledge base 151 and produces computer code 1513. Computer code 13 is comprised of one or more text files formed of computer code which can be compiled to produce executable code or may, in the alternative, be interpreted. Compiled code is code which has been processed from source code to construct executable code. Interpreted code is code which is interpreted by any executable. Code generator 1511 is associated with acomputer language in which code 1513 is written. As a result, when invoked, code generator 1511 operates to extract knowledge form knowledge base 151 and to convert or translate the knowledge into computer code 1513. While only one code generator 1511 is illustrated, there exists therefore a plurality of code generators 1511 in connectivity with knowledge base 151 corresponding in number to the number of computer languages in which computer code 1513 can be produced.

When a user causes the knowledge contained in the knowledge base 151 to be converted to computer code 1513, the knowledge base 151 operates to request the encoding of logical functionality enclosed within. Examples of such functionality include, but are not limited to, Business Rules, Business Methods, Attribute definitions, Web pages, and Messages. One such method invoking code generation is described more fully below. The logic utilized to generate each and every computer code 1513 component required to fully implement the logic contained in the knowledge base resides within the knowledge base. In the present invention, this logic resides within the Object Modeler and serves to, amongst other things, request the generation of computer code 1513 and resolve logical incongruities. The resolution of such incongruities will be discussed more fully below.

Figure 16:
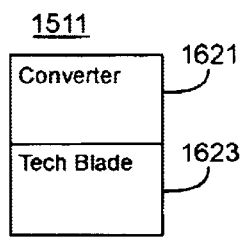
FIG. 16 is a schematic diagram of the generator components.

With reference to FIG. 16, code generator 1511 includes a generator 1621 and a tech blade 1623. This structure serves to bifurcate the logic of the code generator 1511 from the syntax of the language which it is designed to output. Specifically, generator 1621 is formed of executable code which serves to define the structure of a computer language. Tech blade 1623 is a flat file, or text file, which defines the syntax of the computer language. In this manner, changes to the syntax of a language can be implemented by altering the structure of the tech blade 1623 without requiring changes to the generator 1621. Likewise, changes in the structure of a language can be implemented by altering the structure of the generator 1621 without requiring changes to the tech blade 1623. Examples of code generation are detailed below. By way of analogy, one might imagine the generator for an English translator containing grammatical rules such as adjectives precede nouns. A similar translator for French would dictate that adjectives follow the nouns they modify. The tech blade for English might dictate that the word "car" refers to a personal form of transportation. Therefore, the generator might generate the sentence "The fast car" by placing the adjective "fast" before the word "car." If the English language changed to prefer the use of the word "automobile," the tech blade would be altered by inserting "automobile" for "car." The next time the generator was operated the sentence "The fast automobile" would be generated. Similarly, if the logic in the generator were changed to place adjectives after the nouns they modify, the sentence "The car fast" would be generated. In this manner, there is illustrated the separation of logical structure from syntax.

Figure 17:
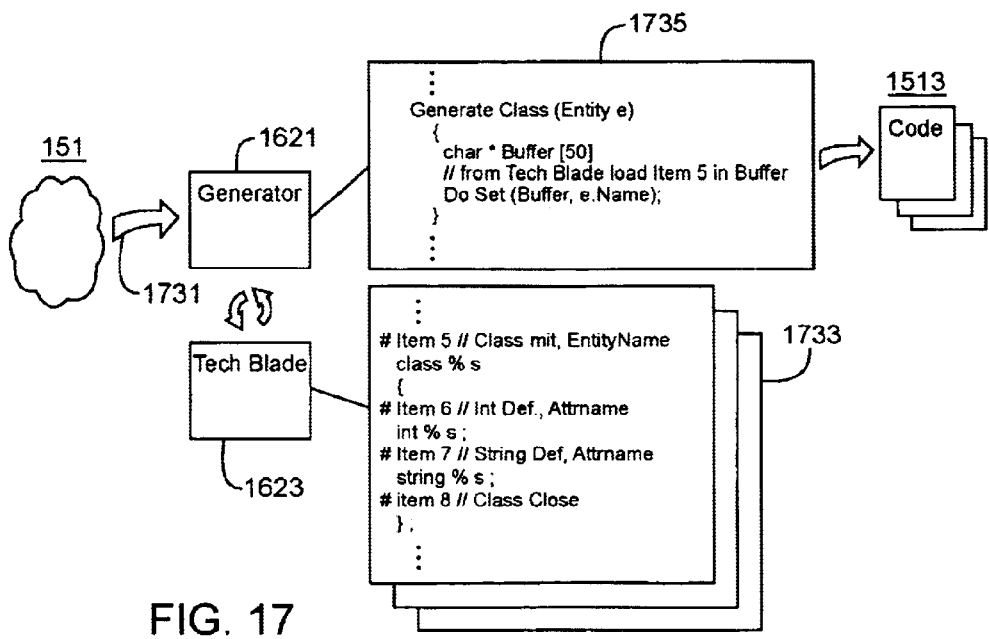
FIG. 17 is an illustration of the composition of the generator components.

The code generator 1511 and tech blade 1623 of the present invention, while operating similar to the analogy above, differ in at least one respect. The tech blades 1623 of the present invention contain computer syntax which itself contains simple logic. With reference to FIG. 17, there is described a process of computer code generation for a class definition. A class definition is computer syntax that indicates the definition of an object oriented class member. There is illustrated generation request 1731. Generation request 1731 originated from knowledge base 151 when there was initiated within the knowledge base a request to generate computer code 1513. In this example, generation request 1731 requests that a class definition be coded in the C++ computer language for an entity although use of other computer languages is equally supported by the invention. In the present invention, entities are implemented as Business Classes.

Generation request 1731 is sent to generator 1621. Illustrated in generator code 1735 is a fragment of code that comprises generator 1621. The code is as follows:

```
GenerateClass(Entity e)
{
    char*Buffer[50]//from Tech Blade LoadItem(5) in
        Buffer DoSet(Buffer,e.Name);
}
```

When the function GenerateClass is called and passed an Entity structure as an argument, the function proceeds to retrieve the syntax for initializing a structure from tech blade 23 and writes the result to computer code 1513. Referring to generator code 1735, when GenerateClass is invoked, there is allocated an exemplary fifty bytes of space to form the array Buffer. While this example utilizes a buffer of fifty bytes in length, any length may be defined which is large enough to hold the desired data. As indicated by the pseudo-code immediately following the allocation of this space, function LoadItem is called and passed the argument "5." Generator 1621 contains in its logic the knowledge that the fifth item contained in tech blade 1623 contains the syntax to initialize a class. This syntax is loaded into Buffer. A portion of the text comprising tech blade 1623 is illustrated in tech blade code 1733 and is as follows:

```
#Item 5 //Class init, Entity Name
class %s
{
#Item 6 //int definition, AttrName
int %s;
#Item 7 //string definition, AttrName
string %s;
#Item 8 //Class close
};
```

As a result, Buffer now contains the text string "class %s" followed by the character for a carriage return, followed by a "{". The "{" character signals the beginning of attributes which form the defined class. Next the function DoSet is invoked and passed the arguments consisting of a pointer to the memory space containing Buffer and a pointer and the attribute of the entity structure containing its name. While not illustrated, the function DoSet will read Buffer, search for the string indicator "%s", and replace the string indicator with the name of the entity. If the name contained in the structure defining the entity passed by generation request 1731 was "Customer," DoSet would terminate with Buffer containing the text string "class Customer" followed by the character for a carriage return, followed by a "{". Buffer would then be written out as computer code 1513. This process of code generation would repeat with additional code assembled in Buffer being appended to computer code 1513 until the computer code requested by generation request 1731 is completed.

For example, the class definition for the Business Class "Customer" might include an integer age attribute and a string attribute containing the customer's name. As a result, generator 1621 would invoke the function in generator code 1735 required to retrieve from tech blade code 1733 the appropriate syntax for defining integer and string variables and closing a class definition. The resulting code outputted to computer code 1513 might appear as follows:

```
Class Customer
{
int Age;
string Name;
}
```

Note the manner in which changes to both the logic and the syntax of generator 1511 may be implemented. For example, if by convention the syntax for specifying a class in C++ is altered to require that classes be defined by the word "GlobalClass" instead of "class", tech blade code 1733 would merely be modified to include the following:

```
#Item 5 //Class init, Entity Name
GlobalClass %s
{
```

Similarly, if the order in which variable definitions, such as integers and strings, must be defined were altered by convention in C++, the code contained in generator code 1735 would be altered to reflect this requirement. The resulting computer code 1513 generated after these changes would reflect the proper order and syntax of the new requirements.

Figure 18:
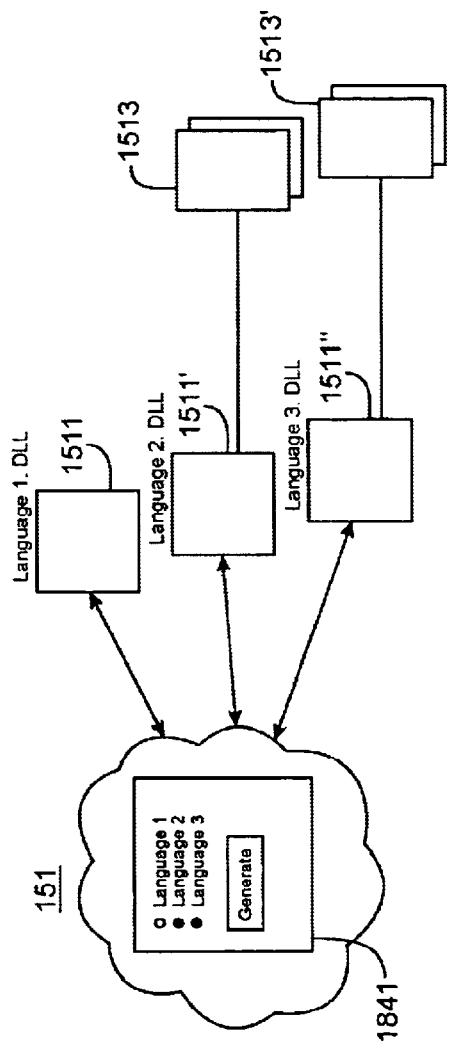
FIG. 18 is a schematic diagram of one embodiment of the present invention illustrating connectivity of generators.

There is illustrated in FIG. 18 a sample GUI from which knowledge base 151 may be converted into computer code 1513 via the invocation of a plurality of generators 1511, 1511',1511". Generate GUI 1841 is illustrated as a window containing a plurality of radio buttons, one for each available language into which knowledge base 151 logic may be generated, and a generate button for commencing execution of the generation process. In FIG. 18, each of the plurality of generators 1511 is illustrated as an independent dynamic link library (DLL). At execution time, DLLs may be linked to and accessed as needed by an application. While the present invention is not limited to the use of DLLs to provide access to knowledge base 151 to the code generators 1511, the use of DLLs allows a user to install and make available to knowledge base 151 only those code generators 1511 which are of interest to the user. As pictured, the code that creates generate GUI 1841 searches for available DLLs and presents only those that are available to the user in the form of radio button options. In the present example, there is illustrated the existence of three DLLs from which the user has selected "Language 2" and "Language 3." As a result, all of the logic contained in knowledge base 151 which must be generated as executable code in order to implement the business functionality modeled within knowledge base 151 will be generated via code generators 1511 into computer code 1513 in the two languages selected. If the computer code 1513 is written in a compilable format, the code would then be compiled into an executable and stored on an appropriate platform to facilitate proper operation of the code. If the code is written in a language which is interpreted rather than compiled, no such compilation is required.

With reference to FIG. 17, one advantage of the present invention is the ability to perform robust code validation prior to code generation. The present invention allows a user to define the code which comprises Business Classes, Business Methods, and other logic in a neutral language such as NeuVis script, or NeuScript. While the present invention is drawn broadly to the use of any language independent script capable of defining program logic, there is illustrated herein the use of NeuScript. NeuScript is a language created by NeuVis Inc. of Shelton, Connecticut, and is capable of defining program logic in a neutral manner. Thus, while the present invention is illustrated with reference to NeuScript, any defined neutral language may be implemented. As used herein, a neutral language is a form of a computer language, which may or may not be a generally accepted and usable, which contains defined logic. As such, NeuScript is a generic format in which to encode logic. The attendant generators 1621 of the present invention are comprised of the logic required to convert NeuScript into individual computer languages as desired. It would of course be possible for the knowledge base 151 to request from generator 1621 a direct generation of the NeuScript used to encode Business Rules, Business Methods, and the like. However, in some instances, such a direct method of code generation would result in computer code 1513 which could not be properly compiled. In other instances, the resulting computer code 1513 might compile without errors but would not execute as expected.

It is therefore one advantage of the present invention that detailed examination of user defined NeuScript can be performed in real time or at any other time prior to code generation. Such an examination may be employed through the use of logic included in the present invention's Object Modeler. Such NeuScript code examination would involve, but is not limited to, key word checking, space character elimination, and scope conflict checking. For example, a user might define a variable named "mint" to represent the attribute of an intermediate price. However, "int" is a defined key word in several computer languages. Key words are reserved words which define the syntax of a computer language and may not be used to as variable names. Were the variable "int" merely translated into computer code without modification, the resulting code might not compile or might not execute correctly.

Figure 19:
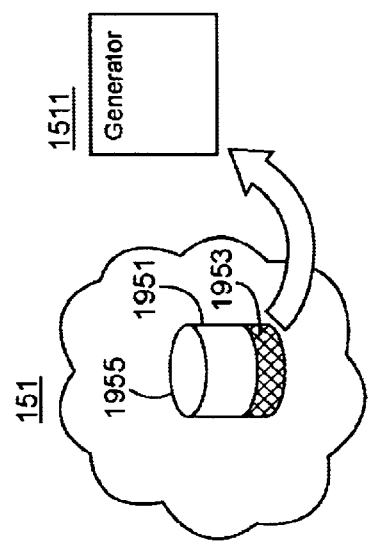
FIG. 19 is a schematic diagram of the centralized repository and its interaction with the generator.

With reference to FIG. 19, there is illustrated centralized repository 1955. Centralized repository 1955 maintains all of the Business Class definitions necessary to model a desired business functionality and included in knowledge base 151. Centralized repository is comprised of defined data 1951 and refined data 1953. Defined data 1951 contains all of the Business Class definitions as entered by the user. Refined data 1953 contains copies of portions of defined data 1951 altered, or refined, to eliminate syntax and structure which might result in improper code generation. The present invention's Object Modeler contains logic to implement defined refinements of defined data 1951. With respect to the previous example, the user would not be restricted from using the variable "int." However, in addition to storing the attribute with the name of "int" in defined data 1951, the same attribute could be stored in refined data 1953 as "int1." While the GUI through which the user interacts to define attributes would display the name "int," the present invention would maintain a record of the altered name in refined data 1953. The present invention is not limited in any manner to the method whereby the syntax of an attribute or other data type is altered, but rather broadly encompasses any desired method for accomplishing such alteration.

In a similar fashion, the present invention can remove spaces from attribute names. For example, a user might define the price for a given object using the attribute name "price for." Many computer languages do not allow spaces within a variable name. Therefore, the present invention would store the attribute name as "price for" in defined data 1951, but as "price_for" in refined data 1953. The resulting generated computer code 1513 would contain instances of the attribute as "price_for."

Still another instance when altering defined code 1951 to be stored as refined data 1953 might be desired is in avoiding variable scope conflicts. It is possible in many computer languages to utilize identically named variables in more than one place. Languages, such as C++, implement the concept of scope. Variables defined as global in nature are accessible everywhere by name. Variables may also be defined locally and are not accessible outside the confines of the scope in which they are defined. As a result, identically named attributes can be used in multiple places without ambiguity as their values are resolved by their attendant scopes.

A user of the present invention might code a Business Rule for deriving the value of a cost attribute as "this.price* tax" where this.price and tax are the price and tax attributes respectively of the selected Business Class. However, it is also possible to code the Business Rule as mentioned without the existence of a tax attribute defined within the Business Class. Perhaps tax is an attribute located within another related Business Class. Perhaps tax is a globally defined variable that is the same for all Business Classes. Lastly, perhaps the Business Class which will define attribute tax has yet to be coded and therefore the tax attribute does not exist at present.

Because the present invention allows for the definition of Business Classes which contain information on the relationship between a Business Class as well as other related Business Classes, the Object Modeler of the present invention permits real time code checking. For example, after entering a Business Rule, Business Method, or other logical code, the logic of the present invention's Object Modeler may parse the IOScript for variable existence and scope and inform the user with such information as is deemed helpful. Such error or warning messages may be exhibited to the user subsequent to entering logic in any manner. For example, entering the variable tax, if it exists nowhere else in the repository, might elicit a warning message to be displayed to the user with the information that a variable has been entered which does not yet exist. Were the user to request code generation prior to defining the variable tax in an appropriate manner, the resulting code would not compile correctly. Likewise, the present invention might warn the user of possible scope issues present when using a variable name which is elsewhere defined as a global variable.

While the present invention is illustrated with reference to key word checking, space character elimination, and scope conflict checking, the present invention broadly encompasses any logic resident and operating within the knowledge base 151 which serves to alter user or system defined code so as to eradicate logical or syntactic aspects of the logic which might result in the generation of improper computer code 1513.

What is claimed is:

1. A method of generating language specific code comprising the steps of:
   receiving a request from a knowledge base to generate target language code from neutral code stored in said knowledge base;
   extracting said neutral code from said knowledge base;
   preprocessing said neutral code;
   providing a code generator with said preprocessed neutral code and a target language in to which said preprocessed neutral code is to be translated; and
   processing said preprocessed neutral code by translating said neutral code into said target language code.

2. The method of claim 1 wherein the code generator comprises: a generator comprising the logical rules which form said target language, and a tech blade component comprising the syntax of said target language.

3. The method of claim 1 wherein processing said preprocessed neutral code comprises the step of invoking a code generator to translate said neutral code into target language code.

4. The method of claim 1 wherein translating said neutral code into target language code comprises the steps of:
   requesting syntactic information from a tech blade; and
   combining the structure of said neutral code with said syntactic information.

5. The method of claim 1 wherein the preprocessing of said neutral code comprises the step of removing space characters from variable names.

6. The method of claim 1 wherein the preprocessing of said neutral code comprises the step of resolving variable scope conflicts.

7. The method of claim 1 wherein the preprocessing of said neutral code comprises the step of interactively alerting a user of possible undefined or misdefined variables.

8. The method of claim 1 wherein the code generator is stored as a dynamic link library (DLL).

9. A method of generating language specific code comprising the steps of:

receiving a request from a knowledge base to generate target language code from neutral code stored in said knowledge base;

extracting said neutral code from said knowledge base;

providing a code generator with said neutral code and a target language in to which said neutral code is to be translated; and processing said neutral code by translating said neutral code into said target language code.

10. The method of claim 9 wherein the code generator comprises:

a generator comprising the logical rules which form said target language, and a tech blade component comprising the syntax of said target language.

11. The method of claim 9 wherein processing said neutral code comprises the step of invoking a code generator to translate said neutral code into target language code.

12. The method of claim 9 wherein translating said neutral code into target language code comprises the steps of:

requesting syntactic information from a tech blade; and combining the structure of said neutral code with said syntactic information.

13. The method of claim 9 further comprising preprocessing said neutral code.

14. The method of claim 13 wherein the preprocessing of said neutral code comprises the step of removing space characters from variable names.

15. The method of claim 13 wherein the preprocessing of said neutral code comprises the step of resolving variable scope conflicts.

16. The method of claim 13 wherein the preprocessing of said neutral code comprises the step of interactively alerting a user of possible undefined or misdefined variables.

17. The method of claim 9 wherein the code generator is stored as a dynamic link library (DLL).

* * * * *